US009827155B2

(12) United States Patent
Huttenhuis et al.

(10) Patent No.: US 9,827,155 B2
(45) Date of Patent: Nov. 28, 2017

(54) BACKREST, METHOD FOR ADJUSTING A BACKREST AND (WHEEL) CHAIR PROVIDED WITH A BACKREST

(75) Inventors: Alouisius Gerhardus Huttenhuis, Denekamp (NL); Tijn Pieter Lodewijk Huttenhuis, Denekamp (NL)

(73) Assignee: P.R. Sella B.V., Oldenzaal (NL)

( * ) Notice: Subject to any disclaimer, the term of this patent is extended or adjusted under 35 U.S.C. 154(b) by 121 days.

(21) Appl. No.: 14/113,687

(22) PCT Filed: Apr. 26, 2012

(86) PCT No.: PCT/NL2012/050286
§ 371 (c)(1),
(2), (4) Date: Nov. 27, 2013

(87) PCT Pub. No.: WO2012/148271
PCT Pub. Date: Nov. 1, 2012

(65) Prior Publication Data
US 2014/0077547 A1    Mar. 20, 2014

(30) Foreign Application Priority Data
Apr. 26, 2011  (NL) .................................. 2006664

(51) Int. Cl.
*A61G 5/12*     (2006.01)
*A61G 5/10*     (2006.01)
(Continued)

(52) U.S. Cl.
CPC ............. *A61G 5/12* (2013.01); *A61G 5/1043* (2013.01); *A61G 5/1067* (2013.01);
(Continued)

(58) Field of Classification Search
None
See application file for complete search history.

(56) References Cited

U.S. PATENT DOCUMENTS 4,522,447 A * 6/1985 Snyder .................... A47C 7/022
297/452.27
4,658,807 A * 4/1987 Swain .................... A47C 7/405
602/19
(Continued)

FOREIGN PATENT DOCUMENTS

WO   WO-9116874   11/1991
WO   WO-9607344    3/1996
(Continued)

*Primary Examiner* — David E Allred
(74) *Attorney, Agent, or Firm* — Marcus C. Dawes; Daniel L. Dawes

(57) ABSTRACT

The invention relates to a backrest for supporting the back of a seated person, the backrest comprising mounting means for mounting the backrest on a frame of a seating device; comprising: —a first back part for supporting at least a part of the back of the person at a determined angle, which first back part has a stiffness such that during use the part of the back shapes itself substantially to the first back part, and wherein the backrest comprises adjusting means for adjusting the angle and/or the position of the first back part relative to the frame; and —a second back part which has a flexibility such that during use the second back part shapes itself substantially continuously to another part of the back of the person. The invention further relates to a method for adjusting such a backrest and a (wheel) chair provided with such a backrest.

18 Claims, 17 Drawing Sheets

(51) Int. Cl.
*B29C 44/18* (2006.01)
*B29L 31/58* (2006.01)
*B29K 75/00* (2006.01)

(52) U.S. Cl.
CPC ............ *A61G 5/1091* (2016.11); *A61G 5/122* (2016.11); *B29C 44/18* (2013.01); *A61G 2210/10* (2013.01); *A61G 2210/70* (2013.01); *B29K 2075/00* (2013.01); *B29L 2031/58* (2013.01); *Y10T 29/49718* (2015.01)

(56) References Cited

U.S. PATENT DOCUMENTS

| | | | | |
|---|---|---|---|---|
| 4,773,702 | A * | 9/1988 | Takahashi | B62B 9/104 297/218.1 |
| 4,828,325 | A | 5/1989 | Brooks | |
| 5,149,173 | A * | 9/1992 | Jay | A61G 5/12 297/284.9 |
| 5,211,446 | A * | 5/1993 | Jay | A61G 5/12 297/284.7 |
| 5,447,356 | A * | 9/1995 | Snijders | A47C 7/405 297/284.3 |
| 5,865,504 | A * | 2/1999 | Warhaftig | A61G 5/12 297/354.12 |
| 6,257,664 | B1 * | 7/2001 | Chew | A47C 7/405 297/284.9 |
| 6,481,801 | B1 * | 11/2002 | Schmale | 297/452.27 |
| 6,533,358 | B1 * | 3/2003 | Avihod | A61G 5/10 297/354.12 |
| 7,802,853 | B2 * | 9/2010 | Ebe | A47C 7/18 297/452.27 |
| 8,668,045 | B2 * | 3/2014 | Cohen | A61H 23/0236 181/150 |
| 8,702,175 | B2 * | 4/2014 | Funaki | B60N 2/4228 297/452.34 |
| 8,882,202 | B2 * | 11/2014 | Petzel | A47C 31/006 297/452.27 |
| 2003/0030318 | A1 * | 2/2003 | Christofferson | A47C 7/46 297/452.34 |
| 2005/0116525 | A1 * | 6/2005 | Holcomb | A61G 5/12 297/452.29 |
| 2006/0091706 | A1 * | 5/2006 | Christofferson | A61G 5/1067 297/130 |
| 2006/0170274 | A1 * | 8/2006 | Moule | B60N 2/643 297/452.25 |
| 2013/0180530 | A1 * | 7/2013 | Choi | A61G 7/05776 128/889 |
| 2013/0180531 | A1 * | 7/2013 | Choi | A61G 7/05776 128/889 |

FOREIGN PATENT DOCUMENTS

| | | | |
|---|---|---|---|
| WO | WO 0143685 A1 * | 6/2001 | ............ A47C 7/022 |
| WO | WO-03034869 | 5/2003 | |
| WO | WO-2008002919 | 1/2008 | |
| WO | WO-2009084961 | 7/2009 | |

\* cited by examiner

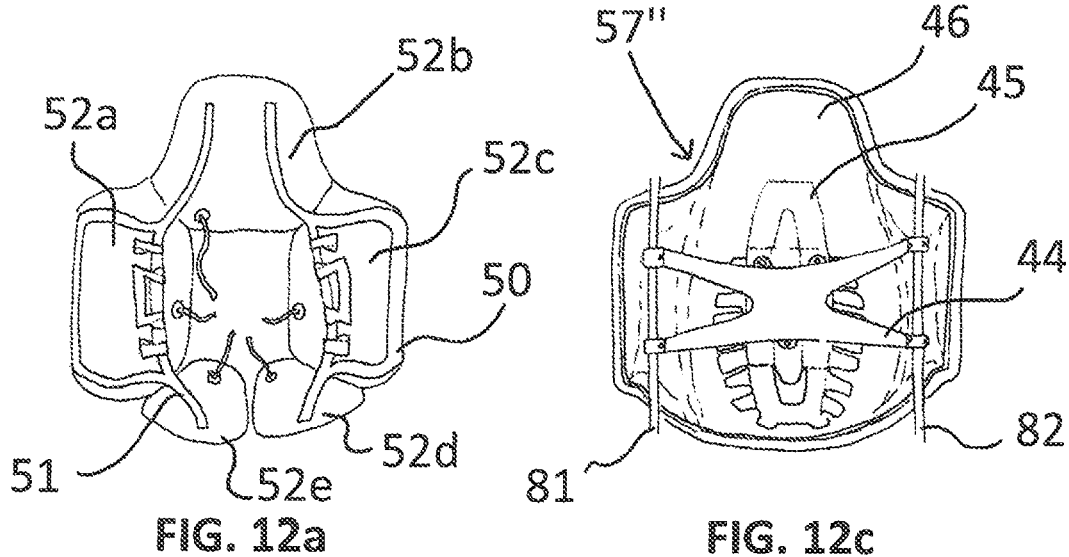
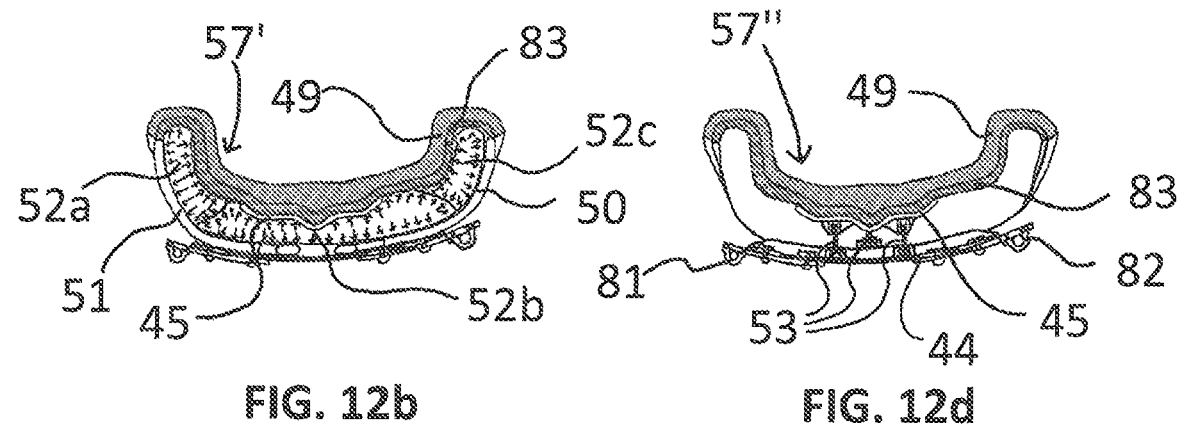
FIG. 12a  FIG. 12c
FIG. 12b  FIG. 12d

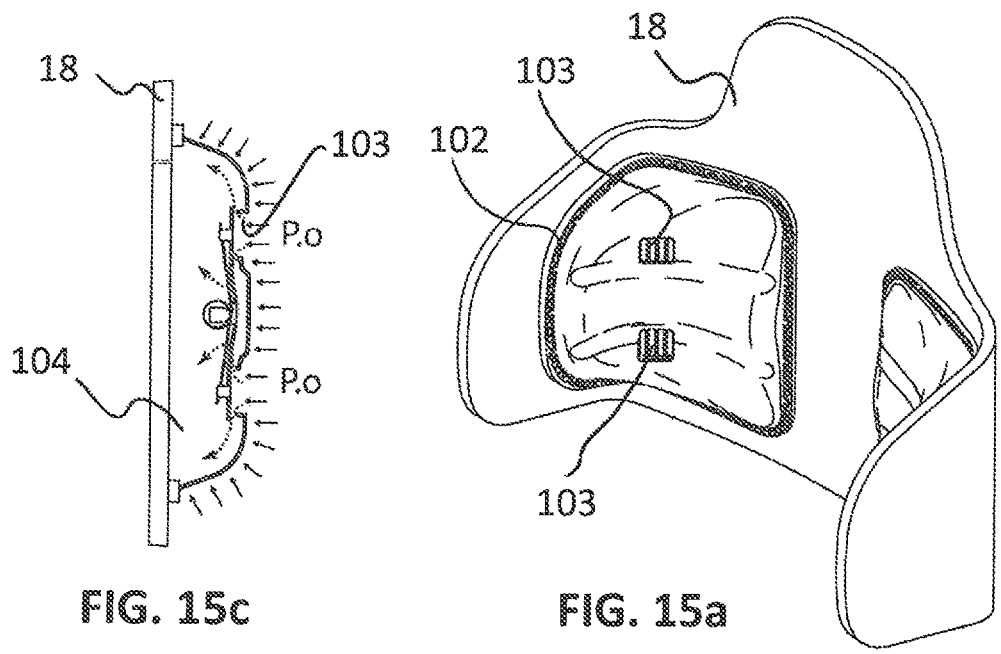
FIG. 15c
FIG. 15a
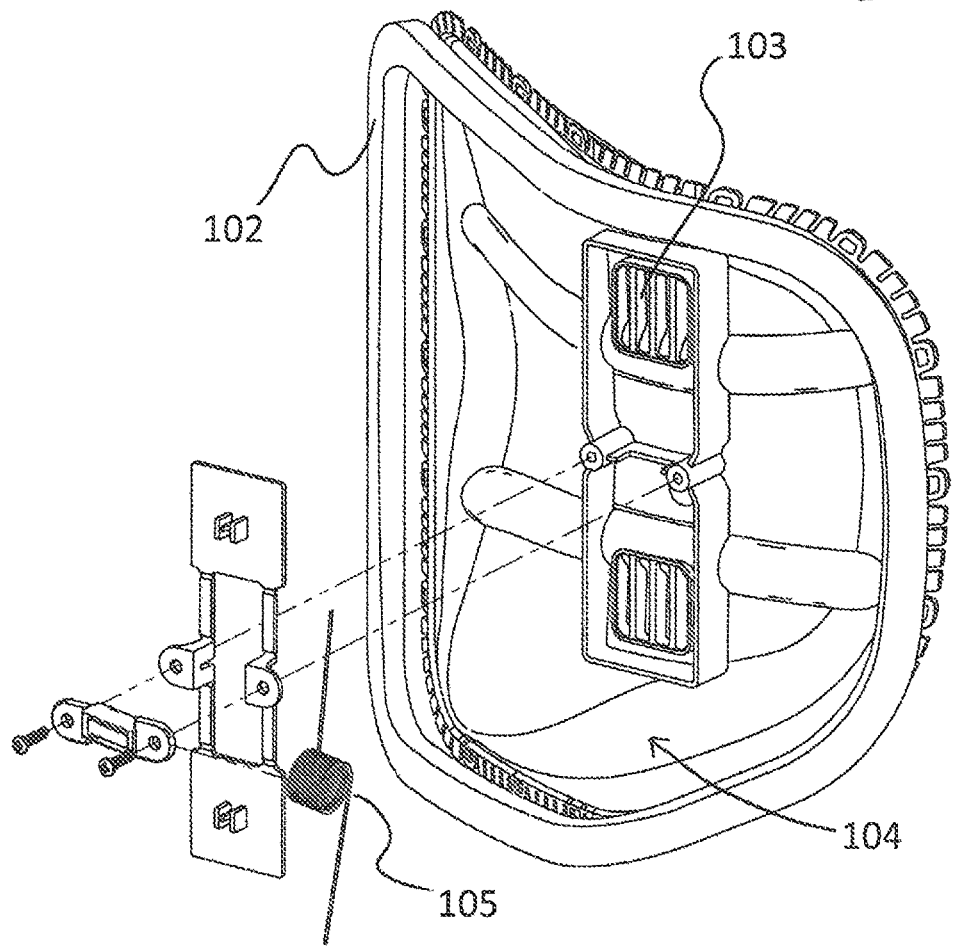
FIG. 15b

BACKREST, METHOD FOR ADJUSTING A BACKREST AND (WHEEL) CHAIR PROVIDED WITH A BACKREST

The invention relates to a backrest for supporting the back of a seated person, the backrest comprising mounting means for mounting the backrest on a frame of a seating device, for instance a (wheel)chair. The invention further relates to a method for adjusting such a backrest and a (wheel)chair provided with such a backrest.

Such a backrest is generally known. A drawback of the generally known backrests is that they do not provide the option, or do so to only limited extent, of supporting the back of a seated person in a simple and/or reproducible manner such that the back adopts a stable and anatomically correct posture. With backrests which do not provide correct support a common occurrence, particularly among people who sit for prolonged periods of time because they are for instance unable to walk and cannot change sitting position, or hardly so, are sitting-related problems such as shoulder pain, back pain, pain in the seat area, which can result in decubitus, particularly on the seat area.

The invention has for its object to at least partially obviate the above stated drawbacks. The invention has for its particular object to provide a backrest of the type stated in the preamble which supports the back of a seated person in an anatomically correct and/or simple and/or reproducible manner.

The backrest of the type stated in the preamble comprises for this purpose according to the invention:
- a first back part for supporting at least a part of the back of the person at a determined angle, which first back part has a stiffness such that during use the part of the back shapes itself substantially to the first back part, and wherein the backrest comprises adjusting means for adjusting the angle and/or the position of the first back part relative to the frame; and
- a second back part which has a flexibility such that during use the second back part shapes itself substantially continuously to another part of the back of the person.

Owing to the stiffness of the first back part the back of the seated person shapes itself such that the part of the back, particularly the spinal column, acquires a desired correction when the first back part is correctly adjusted relative to the frame of the seating device. The second back part on the other hand deforms, i.e. shapes itself substantially continuously to the other part of the back of the seated person during use, so that a correct support is provided at the correct locations of the back. In this way a backrest according to the invention provides a good back support to the seated person. The backrest according to the invention for instance provides a correct support for a person with a gibbus (hunchback), since the second back part adjusts itself almost continuously to the shape of the back of this person. For an explanation regarding an anatomically correct stable support of the back of a seated person reference is made to the Netherlands patent publication with number 2002388.

The patent application number WO-A1-96/07344 describes a central panel, of which only the curvature can be adjusted to the shape of the back, and a number of flexible side panels which are adjusted to the posture of the user with use of adjustable knobs and do not therefore shape themselves substantially continuously to the back of a person. Because the side panels are adjusted to the back of a person by using the knobs, the position of the side panels is determined by the person who adjusts the knobs and not by the pressure exerted thereon by the back of the seated person.

Another advantage of the backrest according to the invention is that the backrest can be (re)adjusted in simple manner for a random seated person. Adjusting the backrest takes place by adjusting the first back part at a correct position and at a correct angle relative to the frame of the seating device. Adjustment of the second back part takes place in simple manner subsequently or simultaneously by supporting the back of the seated person against the backrest, which second back part will shape itself to the back of the seated person.

Because the backrest is easily readjustable, it can advantageously be used by different people. This can for instance be advantageous when the backrest is mounted on the frame of a seating device which will be used by different people. Such a backrest can advantageously be applied in for instance an aircraft, particularly on relatively long flights. When the backrest is used in such a seating device which will be used by different people, it may be desirable to set the first back part fixedly in a position and at an angle relative to the frame of the seating device which will provide an anatomically correct support for the average person. This can for instance be based on the average height and the average shape of a back of an average person.

In an embodiment of the backrest according to the invention the second back part is adjustable from a first stage, in which the second back part has the flexibility such that the second back part can be shaped to another part of the back of the person, to a second stage in which the second back part is fixed in its setting shaped to the other part of the back.

By fixing the second back part in accordance with the back of the seated person the second back part need only be adjusted anatomically correctly once and, after fixation of the second back part in this anatomically correct position, a good support is provided during further use of the backrest by the same seated person. In the first stage the posture of the seated person can for instance be corrected to an anatomically correct position, for instance by another person holding the seated person in the anatomically correct position. This anatomically correct position of the seated person is maintained during the transition from the first stage to the second stage so that the backrest is fixed in this position. Because the backrest is fixed in the correct position, it will always provide an anatomically correct support to the same seated person.

The backrest according to this embodiment is particularly advantageous for seated persons who are themselves unable to adopt an anatomically correct posture. They now only have to be corrected once to a correct position by another person, wherein after fixation the backrest corrects the seated person to the correct posture.

It is advantageous in this embodiment for the time necessary for the transition from the first stage to the second stage to be relatively short, for instance in the order of magnitude of several minutes.

Another advantage of the backrest according to this embodiment is that fixing of the second back part takes place while the seated person supports against the backrest. No mistakes can hereby be made in fixing of the second back part, as may well occur when a backrest modified to a determined person is for instance manufactured at a distance from the person.

In another embodiment of the backrest according to the invention the second back part can be fixed in mechanical, chemical, thermoplastic or thermosetting manner.

In a practical embodiment of the backrest according to the invention the second back part comprises a cavity with a filling opening for supplying to the cavity a filler which can be fixed in chemical, thermoplastic or thermosetting manner.

The cavity can for instance be filled with a polyurethane foam which cures after filling. The hollow space could also be filled with liquid plaster which cures after filling. The cavity could also be filled with granules, in which cavity a vacuum is created for the purpose of fixation. The cavity can further be filled with a thermoplastic material such as Ethylene Vinyl Acetate. Such a thermoplastic material can be heated to above its softening temperature so that the material softens and can therefore be shaped. The backrest according to the invention can comprise for this purpose heating means for heating at least the second back part to above the softening temperature in order to soften at least the second back part. Through cooling of the thermoplastic material in its shaped position the second back part will be fixed in its shaped position. It is noted here that when a thermoplastic material is used there need not be a cavity, but that the thermoplastic material forms the second back part. Such a second back part can be at least temporarily supported in its first stage by support aids. It is noted that these embodiments serve only by way of indication and are by no means limitative.

The cavity preferably comprises a pressure relief valve for discharging excess filler from the cavity.

Discharging excess filler can prevent the cavity becoming overfull and not providing correct support to the back of the seated person. Breaking or tearing of the second back part can also be prevented.

In order to discharge only excess filler from the cavity, means are preferably provided for discharging air from the cavity. The cavity can for instance be impermeable to filler but porous to air. Air discharge openings can also be provided.

The pressure relief valve can for instance be connected for medium throughflow to a receiving device for receiving the excess filler. The pressure relief valve can also form part of such a receiving device. The receiving device can for instance be connected releasably, and therefore temporarily, to the backrest as well as connected permanently thereto.

Adjusting means are preferably provided for adjusting the pressure relief valve, so that the pressure relief valve is adapted to open at a predetermined pressure in the cavity. Such adjusting means can for instance comprise a spring, wherein the spring tension is chosen such that the pressure relief valve opens at the predetermined pressure in the cavity.

A number of pressure relief valves and/or receiving devices can be provided instead of one pressure relief valve and/or one receiving device.

The invention also relates to a seat part or backrest for a (wheel)chair, which seat part or backrest comprises a cavity with a filling opening for supplying to the cavity a filler which can be fixed in chemical, thermoplastic or thermosetting manner, wherein the cavity comprises a pressure relief valve for discharging excess filler from the cavity.

This seat part or backrest according to this second invention, which seat part or backrest comprises a cavity with a pressure relief valve, can be seen separately from the backrest described in the preamble.

The seat part or backrest according to this second invention can also have one or more of the above described aspects, i.e.:

the means for discharging air from the cavity;

the medium throughflow connection to the receiving device for receiving the excess filler; and the adjusting means for adjusting the pressure relief valve so that the pressure relief valve is adapted to open at a predetermined pressure in the cavity.

For a further description of these aspects reference is made to the foregoing or to the figure description.

It is here also possible for a number of pressure relief valves and/or receiving devices to be provided instead of one pressure relief valve and/or one receiving device.

In an alternative embodiment of the backrest according to the invention the second back part is adjustable from the second stage to the first stage.

Such a backrest has the advantage that it can be readjusted, for instance because the position of the back of the seated person has changed or when another seated person will make use of the backrest. When the second back part is for instance manufactured from a thermoplastic material or comprises a thermoplastic material, adjustment of the second back part from the second stage to the first stage can take place in simple manner, by (re)heating the thermoplastic material.

In yet another embodiment of the backrest according to the invention the back part comprises a third back part which is connected close to an end zone to the peripheral edge zone of the first back part and extends resiliently therefrom in a substantially tangential direction.

The third back part has the advantage that a tangential, continuous transition is provided from the first back part to the second back part. A good pressure distribution is hereby obtained. The third back part for instance provides a continuous transition in a lateral direction, a vertical upward direction and/or a vertical downward direction.

In yet another embodiment of the backrest according to the invention the backrest comprises suction means for drawing in ambient air, which suction means are connected on one side for medium throughflow to the surrounding area and are connected on the other for medium throughflow to openings in a side of the backrest facing toward the back of the seated person.

By means of the suction means an airflow can be supplied to the back of the seated person, which airflow can serve to cool the back of the seated person and remove moisture therefrom.

As stated above, the first back part is adjusted to the correct angle relative to the frame of the seating device in order to impart an anatomically correct support to the back of the seated person. For the purpose of adjusting the first back part to a correct angle relative to the frame, the backrest according to the invention comprises an angle measuring device connected to the first back part, which angle measuring device is adapted to measure and display the angle of the first back part relative to the frame.

In an alternative embodiment of the backrest according to the invention the first back part is provided on its side facing toward the seated person with a pressure distributing medium. Such a pressure distributing medium can particularly be a resiliently compressible medium such as a soft foam part. An advantage of such a pressure distributing medium is that such a pressure distributing medium allows small (positional) changes of the back without this creating excessive loads on the back. The thickness of the pressure distributing material can differ at different locations. At the position of the spinal column the pressure distributing medium can for instance be thicker than at the position of the lumbar region.

The mounting means are practically adapted to mount the backrest at a determined location and/or at a determined angle relative to the frame.

In an embodiment the backrest comprises an optionally releasable counterpressure element for providing a counterpressure on the second back part for the purpose of shaping the second back part to the other part of the back of the person.

The counterpressure element is for instance disposed on the side of the backrest remote from the seated person. Such a counterpressure element is particularly advantageous when the second back part is formed by a thermoplastically deformable element and/or when the second back part is mechanically adjustable.

The invention also relates to a method for adjusting a backrest, comprising the steps, to be performed in suitable sequence, of:

a) providing a backrest as described above, which backrest is intended to support the back of a seated person, which backrest comprises mounting means for mounting the backrest and at least two back parts on a frame of a seating device, for instance a (wheel)chair:
  a first back part for supporting at least a part of the back of the person at a determined angle, which first back part has a stiffness such that during use the part of the back substantially shapes itself to the first back part, and wherein the backrest comprises adjusting means for adjusting the angle and/or the position of the first back part relative to the frame; and
  a second back part which has a flexibility such that during use the second back part shape itself substantially continuously to another part of the back of the person;

b) mounting the backrest at a determined location and/or at a determined angle on the frame of the seating device;

c) adjusting the angle and/or the position of the first back part relative to the frame; and d) the second back part shaping itself substantially continuously to the other part of the back of the person by the back of the person supporting against the second back part.

Using such a method the backrest according to the invention can be adjusted in simple manner to support the back of the seated person in an anatomically correct manner.

In an embodiment of the method according to the invention step c) is performed by performing step b). This can be the case when the first back part is disposed fixedly relative to the backrest. Alternatively, the first back part can be adjusted relative to the backrest.

Yet another embodiment of the method according to the invention comprises the step of:

e) fixing the second back part in its setting shaped to the other part of the back.

Fixing the second back part in its setting shaped to the other part of the back can always provide an anatomically correct support for the same seated person, even when the seated person temporarily leaves the seating device and sits down again in the seating device.

Step e) can for instance comprise of fixing the second back part in chemical, thermoplastic or thermosetting manner in its setting shaped to the other part of the back.

Yet another embodiment of the method according to the invention comprises the step, to be performed during or prior to step d), of:

f) feeding a filler, which can be fixed in chemical, thermoplastic or thermosetting manner, via a filling opening into a cavity of the second back part.

The invention also relates to a (wheel)chair, comprising a backrest for supporting the back of a seated person as described above, which backrest is mounted on a frame of the (wheel)chair and comprises at least two parts:
  a first back part for supporting at least a part of the back of the person at a determined angle, which first back part has a stiffness such that during use the part of the back substantially shapes itself to the first back part, and wherein the backrest comprises adjusting means for adjusting the angle and/or the position of the first back part relative to the frame; and
  a second back part which has a flexibility such that during use the second back part shapes itself substantially continuously to another part of the back of the person.

The invention will now be elucidated with reference to the accompanying drawings. In the drawings:

FIG. 9a shows a frontal section at the depth of the spinal column of the seated person of FIG. 8a;

FIG. 9b shows a frontal section at the depth of the spinal column of the second seated person of FIG. 8a;

FIG. 10a shows a transverse cross-section at the position of the lumbar part of the seated person of FIGS. 8a and 9a;

FIG. 12a shows a rear view of the backrest of FIG. 11 with adjustable pressure cells;

FIG. 12b shows a transverse cross-section of the backrest of FIG. 11;

FIG. 12c shows a rear view of the backrest of FIG. 11 without pressure cells;

FIG. 12d shows a transverse cross-section of the backrest of FIG. 11 without pressure cells;

FIGS. 15*a*, 15*b* and 15*c* show a pressure relief valve according to the invention.

Figure 1:
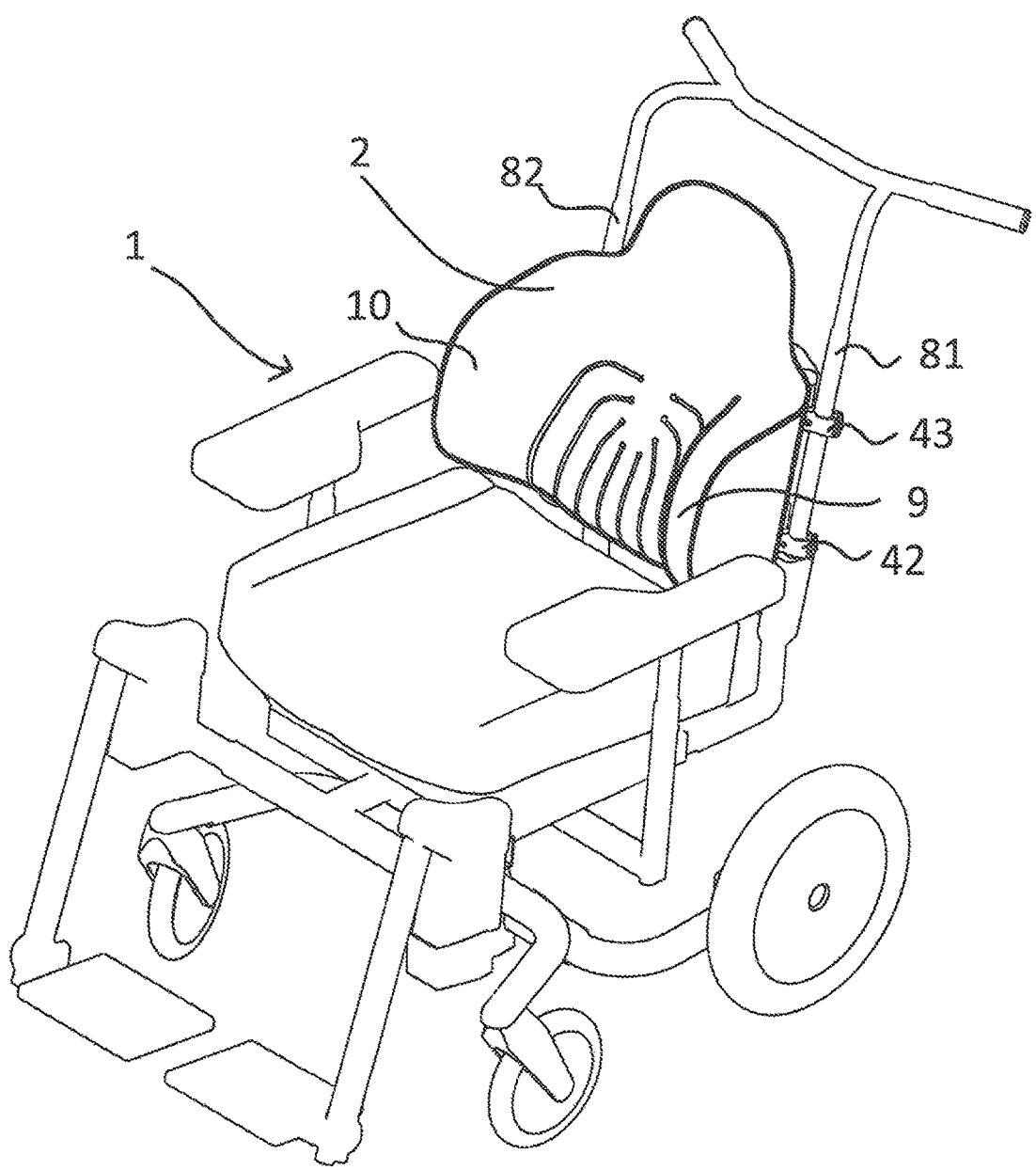
FIG. 1 shows a perspective view of a backrest according to a first embodiment of the invention in the position mounted on a wheelchair.

FIG. 1 shows a wheelchair 1 with a frame 81,82 on which a backrest 2 for supporting the back of a seated person according to a first embodiment of the invention is mounted using mounting means 36-43. FIG. 1 shows that the front surface of backrest 2, or the surface of backrest 2 against which the seated person supports, comprises eight grooves 93 through which a forced airflow can be carried. This airflow is generated by a fan 26 (see FIG. 4), which is for instance integrated into backrest 2.

The front surface and two side supports 9, 10 of backrest 2 have the feature of correcting the spinal column of the seated person and adapting to the individual shape, resulting in an individual orthosis for an anatomically correct support of the back.

Figure 2:
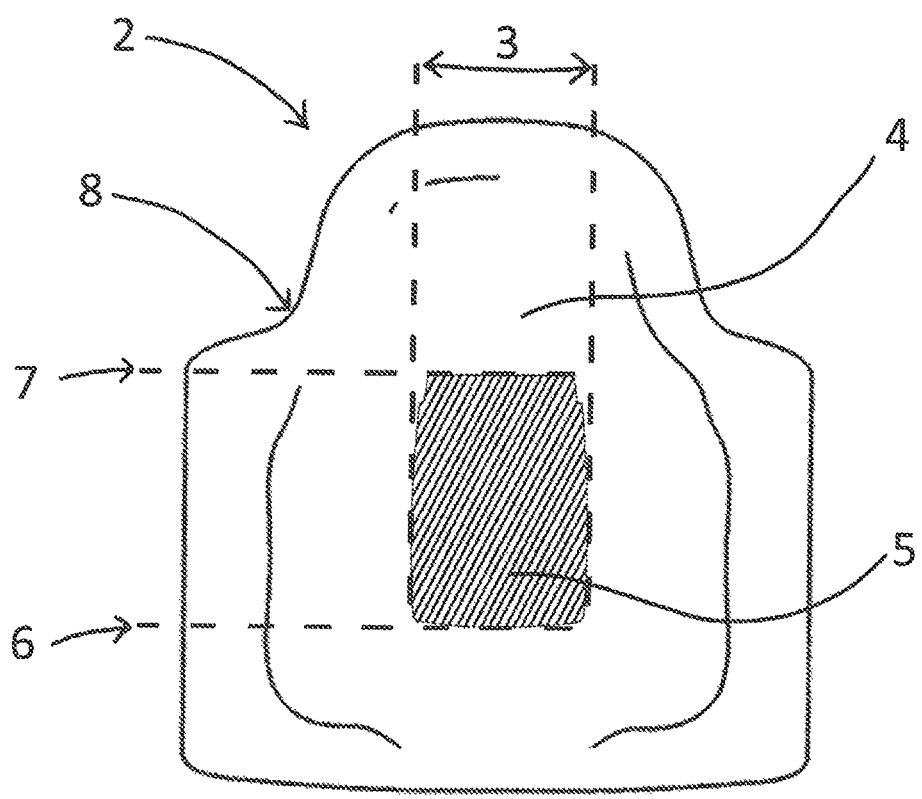
FIG. 2 shows a cross-section through the main plane of the backrest of FIG. 1.

FIG. 2 is a cross-section through the main plane of backrest 2 of FIG. 1 which shows that backrest 2 comprises two different back parts 4,5, which together form the overall support back part 8. A first centrally located back part 5 is adapted to support at least a part of the back of the person at a determined angle, this first back part 5 having a stiffness such that during use the part of the back of the person substantially shapes itself to the first back part 5. First back part 5 for instance has a width 3 of about 12 centimeters and a height of about 15 centimeters. A lower end zone of back part 5 lies at the height of line 6, this line 6 representing the deepest point 68 (see FIG. 13*a*) of the lumbar of the back when the lumbar follows a natural S-curve. The deepest point 68 of the lumbar is normally located at the height of the third lumbar vertebra. An upper end zone of the first back part 5 lies at the height of line 7, this line 7 representing the height of the thoracic vertebra 9 (Th9 in FIG. 13*d*). It will be apparent that the dimensions and location of the first back part 5 can be adapted to the seated person.

The second back part 4 is adjustable from a first stage, in which second back part 4 has a flexibility such that second back part 4 can be shaped to another part of the back of the person, to a second stage in which second back part 4 is fixed in its setting shaped to the other part of the back. In FIG. 1 the second back part 4 is in its first stage so that second back part 4 can be shaped to the individual shape of the end user: the seated person.

Adjustment of backrest 2 to a seated person takes place in three different steps.

In the first step the correct adjustment of the first back part 5 takes place. First back part 5 is a stiff element which is freely adjustable, for instance in height and angle, relative to frame 81,82 of wheelchair 1. Adjustment of the angle takes place by rotating the first back part 5 about a rotation axis formed by the horizontal connecting line between the two frame tubes 81,82 which intersects the deepest point 68 of the lumbar. After correct adjustment of the first back part 5, first back part 5 is fixed in its adjusted position. Adjustment of back part 5 will be further elucidated with reference to FIG. 5. First back part 5 is adjusted in this first step such that the spinal column of the seated person acquires a desired correction. Depending on the presence and degree of for instance kyphosis or lordosis, back part 5 is positioned and set at a determined height and at a determined angle relative to frame 81,82 of wheelchair 1. Some freedom of rotation of +/−20° round axis 78 can be allowed in order to specifically accommodate the asymmetry due to scoliosis in the spinal column of the seated person. Back part 5 is therefore stiff, but can yield to some extent to the shape of the back through rotation about axis 78. In the first step the second back part 4 has the feature that it can be shaped, so that second back part 4 can be shaped to the other part of the back of the seated person. Second back part 4 is thus situated in its first stage.

Once first back part 5 has been adjusted such that the seated person is correctly supported, second back part 4 can be shaped in the second step to the other part of the back of the seated person. Shaping of second back part 4 takes place in that second back part 4 exerts a substantially controlled pressure on the back of the seated person. Due to the controlled pressure the surface of back part 4 will shape itself to the three-dimensional, individual shape of the seated person, so substantially continuously. In the embodiment of backrest 2 according to FIG. 1, exerting of the controlled pressure takes place with a space filled with polyurethane foam and a pressure distributing element, as will be further described below. In other embodiments exerting of the controlled pressure takes place with a thermoplastic or thermosetting material heated to a temperature above the softening point, optionally in combination with a pressure distributing element, or with a mechanically adjustable second back part.

In the third step the second back part 4 is fixed in its setting shaped to the other part of the back as obtained in step 2. This fixation can take place in different ways, for instance by curing the polyurethane foam, by cooling a thermosetting or thermoplastic medium or by mechanically fixing a mechanical back part. The second back part 4 can therefore be fixed in mechanical, chemical, thermoplastic or thermosetting manner. At the end of the third step both back part 4 and back part 5 are form-retaining relative to a carrier element, particularly a carrier shell 18 of backrest 2, such that a seated person is provided with a good support.

Figure 3:
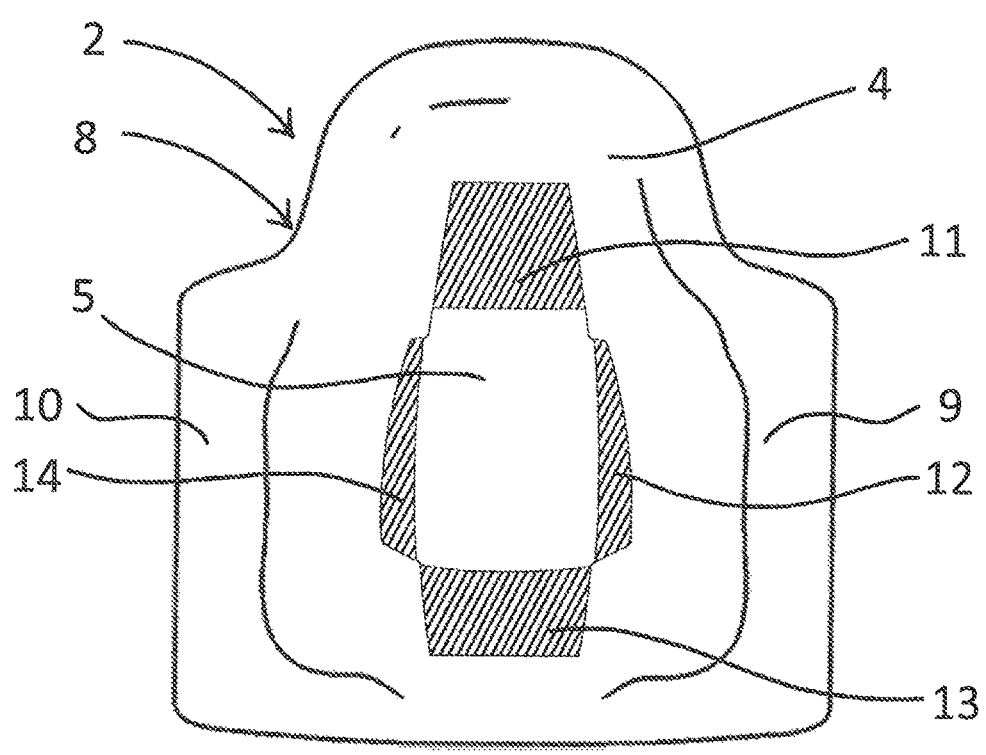
FIG. 3 shows a cross-section through the main plane of a backrest according to a second embodiment of the invention.

FIG. 3 shows a backrest 2 according to a second embodiment of the invention, which backrest 2 comprises three back parts together forming the overall support back part 8. The size and/or positioning and/or features of the first back part 5 can be identical to those of first back part 5 of backrest 2 as described with reference to FIG. 2. The size and/or positioning and/or features of the second back part 4 can be identical to those of second back part 4 of backrest 2 as described with reference to FIG. 2. A difference between backrests 2 of FIGS. 2 and 3 is that, as described above, backrest 2 of FIG. 3 also comprises, in addition to the above described first and second back parts 5,4, a third type of back part 11,12,13 and 14, which third back part 11,12,13 and 14 is adapted to ensure in the second step a gradual transition of the pressure between a peripheral edge zone of the first back part 5 to the second back part 4 extending therearound. This results in a gradual transition of shape and pressure in the third step. Back parts 11, 12, 13 and 14 are movable as a unilaterally clamped leaf spring, wherein one end zone at a time of back parts 11, 12, 13 and 14 is clamped close to the peripheral edge zone of back part 5. Back parts 11, 12, 13 and 14 are resilient elements extending resiliently from their one end zone relative to the first back part 5. The transitional back parts 12,14 provide for a tangential, continuous transition from first back part 5 to second back part 4 in the lateral direction, i.e. from the left and right side of peripheral edge zone 5 to side supports 9,10 of backrest 2. The transitional back part 11 provides for a tangential, continuous transition from first back part 5 to second back part 4 in substantially vertical upward direction, also referred to as the cranial direction (toward the cranial side). The transitional back part 13 provides for a tangential, continuous transition from first back part 5 to second back part 4 in substantially vertical downward direction, also referred to as the caudal direction (toward the tail side). The transitional back parts 11,12,13 and 14 provide for a good pressure distribution.

Figure 4:
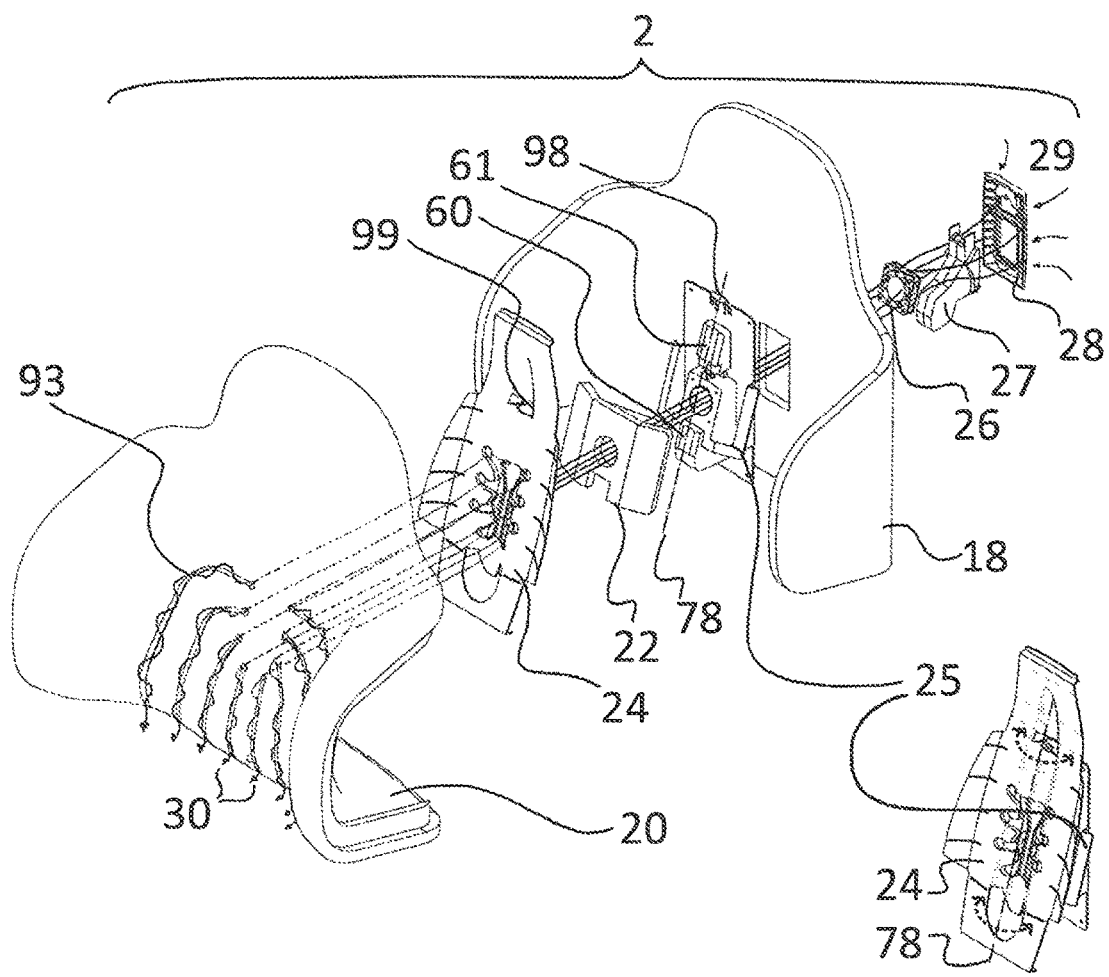
FIG. 4 shows an exploded view of the backrest of FIG. 1.

FIG. 4 shows an exploded view of backrest 2 of FIG. 1. This shows that backrest 2 comprises on its side facing toward the seated person a pressure distributing medium, in particular a flexible foam element 20, against which the seated person supports. Together with carrier shell 18 foam element 20 forms a hollow space 19 (see for instance FIGS. 8a, 8b), which can be filled with for instance polyurethane foam by means of a filling opening. The filling opening can for instance be arranged in carrier shell 18 or foam element 20 and debouches into hollow space 19. The polyurethane foam in hollow space 19 and foam element 20 together form the second back part 4. Extending in hollow space 19 is a support surface 24 which is formed by first back part 5 and, in this embodiment, the third back parts 11, 12, 13 and 14. It will be apparent that support surface 24 supports and shapes the back at a determined angle and position, while the back shapes the polyurethane foam in space 19 and the foam element 20.

Support surface 24 is mounted on a carrier element 25 which is fixedly connected to carrier shell 18. The mounting of support surface 24 on carrier element 25 is realized by a co-acting snap connection 98,99. In this embodiment of backrest 2 support surface 24 has an opening 99 for receiving a protrusion 98 of carrier element 25, although it is also possible for carrier element 25 to be provided with an opening and for support surface 24 to comprise a protrusion. Snap connection 98,99 is flexible such that, in a mounted position on carrier element 25, support surface 24 can rotate to some extent about rotation axis 78, as shown in the detail view of FIG. 4 showing the rotation with broken lines. The maximum rotation of support surface 24 about rotation axis 78 amounts to about ±20□ relative to a non-rotated position in which the main planes of support surface 24 and carrier element 25 extend parallel to each other. Support surface 24 and carrier element 25 are each provided with co-acting contact surfaces for guiding the rotation. As shown in FIG. 4, carrier element 25 has two receiving contact surfaces 60,61 of substantially semi-circular cross-section. The support surface has two contact surfaces extending in the receiving contact surfaces 60,61 and having a substantially wave-like cross-section (see FIGS. 10a and 10b).

Mounted on the rear side of carrier shell 18, i.e. on the side of carrier shell 18 remote from the back, is a fan 26 for drawing in ambient air. Further mounted on the rear side of carrier shell 18 is an angle measuring device 27, which extends through the opening in carrier shell 18 and is connected close to an end zone to carrier element 25, for the purpose of indicating the angle of support surface 24. The angle measuring device is covered using a covering element or cover frame 28.

Figure 5:
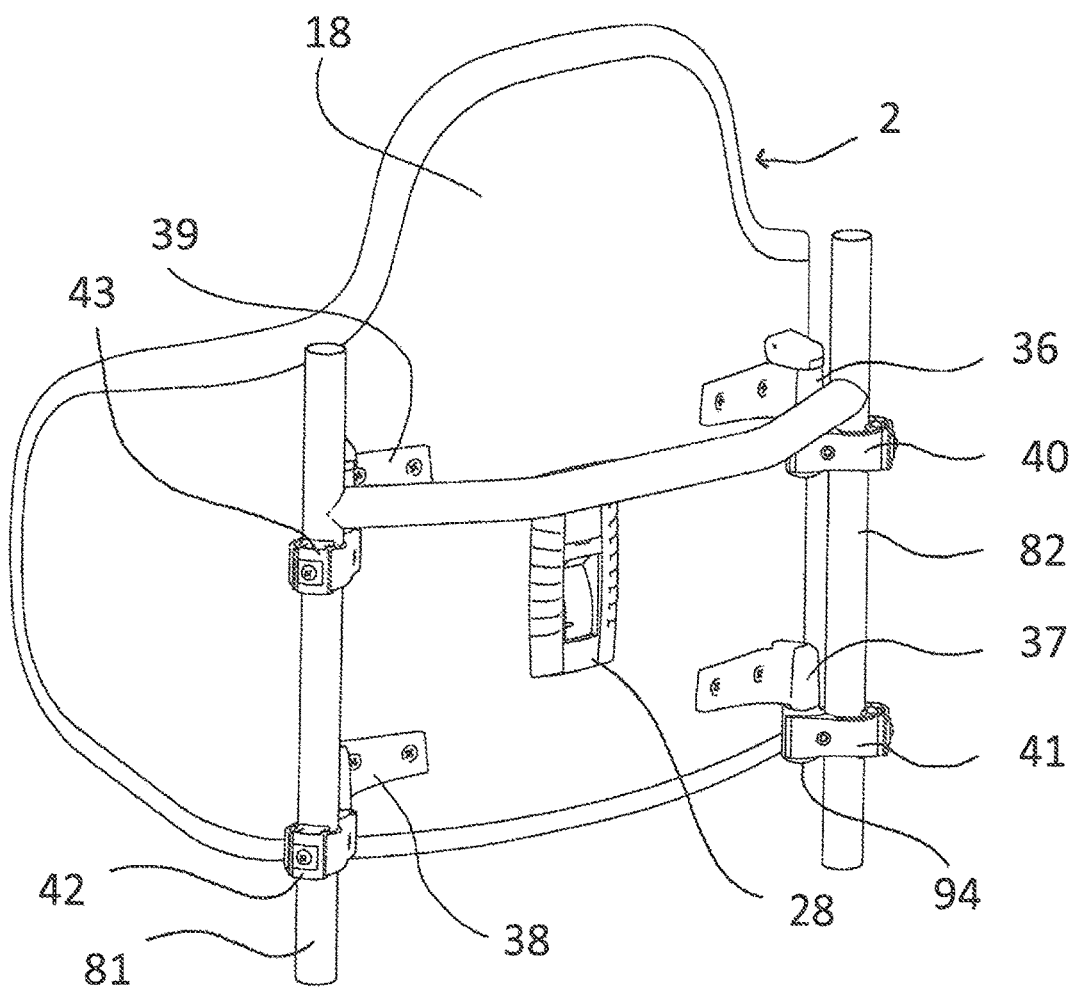
FIG. 5 shows a perspective rear view of the backrest of FIG. 1.

Airflows 92 for cooling and absorbing moisture from the back of the seated person are designated in FIG. 4. The air is suctioned in from the surrounding area 29 through openings in frame 28, after which the air passes through an opening in carrier shell 18, passes angle measuring device 27 and reaches fan 26. The air then flows through a central hole in carrier element 25 and through seal 22 to support surface 24. Between the soft foam part 20, which as described above serves as pressure distributing element, and support surface 24 the air is here distributed to the eight openings or grooves 93 in soft foam part 20. On the front side of backrest 2 the airflow will follow the path of least resistance. Provided a person is sitting against backrest 2, each airflow follows its groove 93. Having provided for the desired cooling and moisture absorption from the back of the seated person along its path, the air can escape at a lower end zone 30 of each groove 93. FIG. 5 shows a perspective rear view of the backrest of FIG. 1 with mounting means 36-42, wherein the mounting means are mounted on one side on carrier shell 18, i.e. mounting means 36-39, and mounted on the other on frame tubes 81 and 82 of wheelchair 1, i.e. mounting means 40-43. The mounting means 36-39 mounted on carrier shell 18 by means of screws each comprise a downward extending pin 94, which pins are received in respective openings of mounting means 40-43 mounted on frame tubes 81, 82. Mounting means 40-43 are adjustable in height and orientation relative to frame tubes 81 and 82, whereby the depth, width and height position and the angle $\alpha+\phi$ (see FIG. 13 and the associated description) of carrier shell 18 and the lumbar-thoracic support surface connected thereto, i.e. back part 5, can to a limited extent be adjusted and fixed in the desired position. Mounting means 40-43 can be fixed to frame tubes 81 and 82 using self-tapping screws. The position of each of the pieces 36-39 on carrier shell 18 can be adjusted as desired by loosening the screws and screwing them fixedly at the desired position to carrier shell 18. The pin-hole connection between mounting means 36-39 and the adjustable mounting means 40-43 allows a small angular displacement of pins 94 in the openings of mounting means 40-43 relative to the longitudinal direction of pins 94. This makes it possible to adjust the position and orientation of carrier shell 18 in all degrees of freedom relative to frame tubes 81,82.

Setting of first back part 5 at a correct location and at a correct angle therefore takes place in the following manner. The height, width and depth position of carrier shell 18 is first determined such that first back part 5, which is connected to carrier shell 18, is located at the correct position relative to the back of the seated person. Particularly the height of carrier shell 18, and thereby the first back part 5, is adjusted such that the lower end zone of first back part 5 comes to lie at the position of the deepest point 68 (see FIG. 13a) of the lumbar of the back, if the lumbar follows a natural S-curve.

Adjustment of the angle $\alpha+\phi$ of first back part 5 then takes place. It is noted that first back part 5 is arranged relative to carrier shell 18 at a determined angle which is defined by the angle between the main plane of carrier element 25 and the angle between the main plane of carrier shell 18. The total angle of first back part 5 relative to frame 81,82 is therefore determined by the sum of the angle between the main plane of carrier element 25 and the main plane of carrier shell 18 and the angle between the main plane of carrier shell 18 and the longitudinal direction of frame tubes 81,82. Since the angle between the main plane of carrier element 25 and the main plane of carrier shell 18 is fixed, adjustment of the angle takes place by adjusting the angle between the main plane of carrier shell 18 and the longitudinal direction of frame tubes 81,82. This angle is set by adjusting the orientation of the lower mounting means 41,42 or upper mounting means 40,43 relative to frame tubes 81,82. In the disposition shown in FIG. 5 both the lower mounting means 41,42 and upper mounting means 40,43 extend obliquely inward toward each other. When for instance only the lower mounting means 41,42 are now displaced outward by rotating the lower mounting means 41,42 outward round frame tubes 81,82, which is possible after mounting means 37,38 have been unscrewed, the lower end zone of carrier shell 18 will be displaced forward, whereby the angle between the main plane of carrier shell 18 and frame 81,82, and thereby the angle of first back part 5, will increase. As soon as the angle is correct, it can be fixed by again screwing mounting means 37,38 onto carrier shell 18 and screwing the lower mounting means 41,42 onto frame tubes 81,82.

Figure 6:
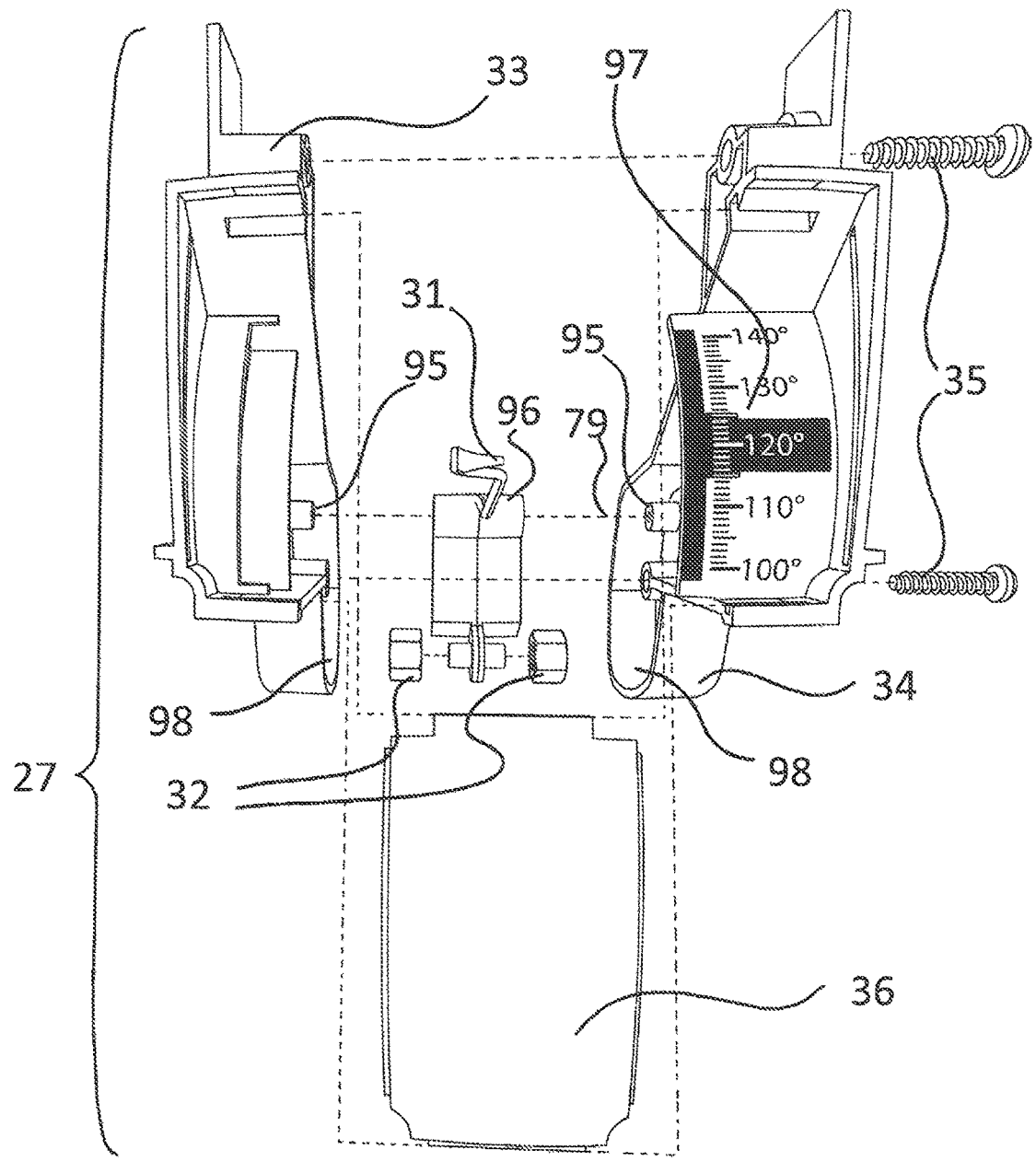
FIG. 6 shows an exploded view of an angle indicator which can be used in the invention.
Figures 7A, 7B, 7C, 7D, 7E:
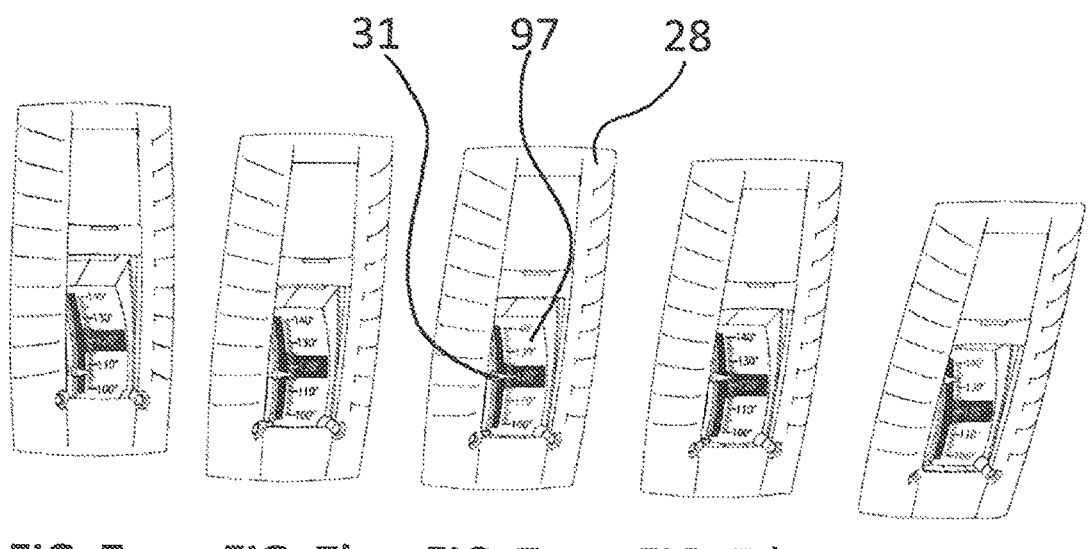
FIGS. 7a-7e show a number of perspective views of the angle indicator, wherein the backrest is set at different angles.

FIG. 6 shows an exploded view of angle indicator 27 which can be applied to adjust the first back part 5 to a desired angle so that the one part of the back of the seated person can be set at a determined angle. Angle indicator 27 indicates the position in which the lumbar-thoracic support surface, i.e. first back part 5, is situated. Angle indicator 27 comprises an indicator element with an indicator tip 31 and an angle indicating element 97, wherein the indicator tip 31 extends over the angle indicating element 97 and thus indicates the angle. The angle indicator is connected to carrier element 25, which is connected on one side to carrier shell 18 that is adjustable in angle and connected on the other to first back part 5. The indicator element with indicator tip 31 is pivotally suspended from cylinders 95 which extend in respective openings 96 of the indicator element, which cylinders 95 are fixedly connected to carrier element 25. The indicator element is provided on its underside with two weights 32 which keep the indicator element balanced. The indicator element hereby extends substantially vertically, irrespective of the position of carrier shell 18. When the angle of backrest 2, and thereby the angle of carrier shell 18 and first back part 5, is now adapted by rotation of backrest 2, the angle indicating element 97 will rotate relative to rotation axis 79 formed by the longitudinal direction of cylinders 95, while the indicator element will remain in its substantially vertical position and hereby indicate the new angle. For the purpose of protection a window 36 is placed between two shell parts 33 and 34 mutually clamped by screws 35. Angle indicator 27 has for instance a measuring range between 100° and 140°, this measuring range being bounded by walls of spaces 98 such that the maximum angle is reached on either side when weights 32 come to lie against the walls of spaces 98.

FIGS. 7a-7e show a number of perspective views of the angle indicator, wherein backrest 2 is set at different angles. Successively from left to right, i.e. from FIG. 7a to FIG. 7e, indicator 31 indicates the following angles: 106°, 116°, 120°, 123° and 133°. Frame 28 covers the whole on the rear side of backrest 2.

FIGS. 8a, 8b, 9a, 9b, 10a and 10b show two seated persons 15 and 15' in different cross-sections, i.e.: sagittal, frontal and transverse. The sections are representative of the second and third steps as elucidated with reference to FIG. 2.

Figure 8A:
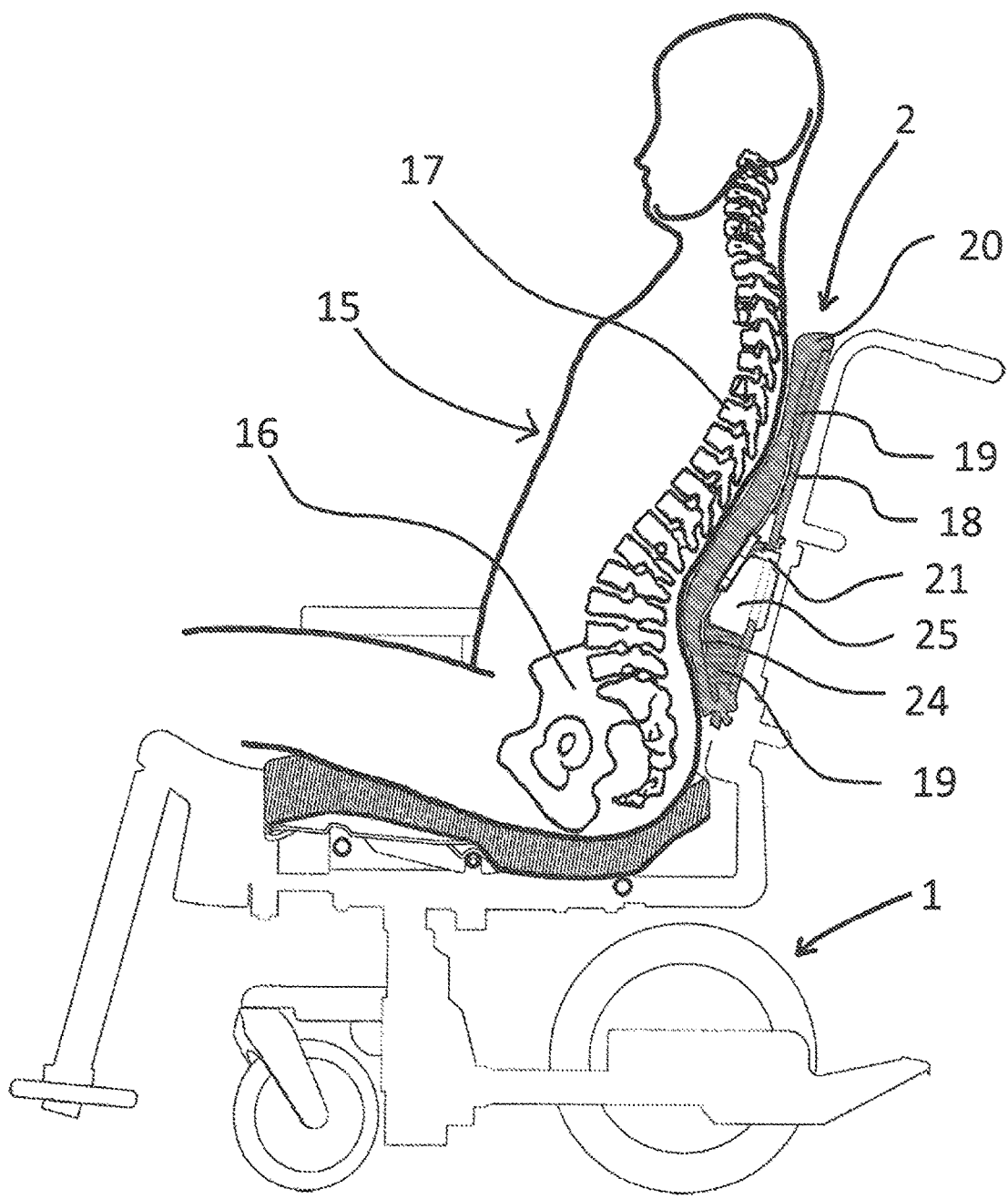
FIG. 8a shows a sagittal cross-section of a seated person supporting against a backrest according to the invention.
Figure 8B:
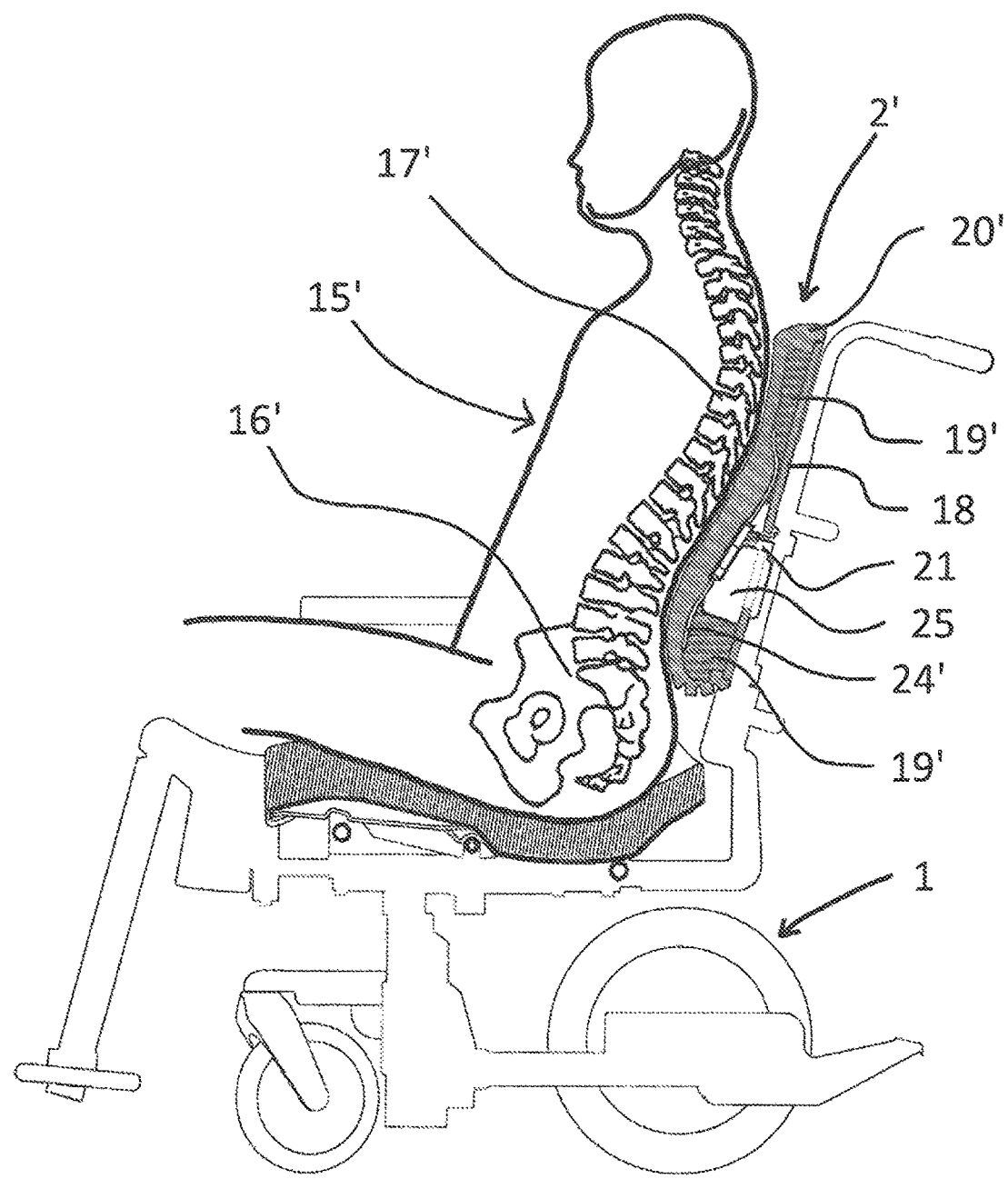
FIG. 8b shows a second sagittal cross-section of a seated person supporting against a backrest according to the invention.

FIGS. 8a, 8b each show a sagittal cross-section of a seated person 15,15', wherein the fit of the second back part 4 of backrest 2 is shaped according to the invention to the individual shape of the spinal column 17,17' and the pelvis 16,16' of seated person 15,15'. In the first step the soft foam parts 20,20' have a nominal shape when a person is not leaning against them, and a volume 19,19' enclosed by soft foam part 20,20' and carrier shell 18,18' is unfilled.

In the second step the unfilled space 19,19' is at least substantially wholly filled with polyurethane. The enclosed air leaves this liquid-tight space 19,19' through the porous soft foam part 20,20' in that the polyurethane displaces the air. When space 19,19' has been filled with the polyurethane, the polyurethane exerts a pressure on the soft foam part 20,20' so that soft foam part 20,20' shapes itself to the contour of seated person 15,15'. It is apparent that different people normally have different shapes, whereby the contacting soft foam parts 20,20' which shape themselves to the shape of the back of seated persons 15,15' will differ from each other, as will also the volumes 19,19'.

In the third step the volume 19,19' and soft foam part 20,20' are fixed in their setting shaped to the other part of the back in that the polyurethane cures in the third step. The position of first back part 5, which is stiff but is rotatable to some extent about rotation axis 78, is likewise fixed by the cured polyurethane. The position of third back part 11,12,13 and 14 is also fixed by the polyurethane. In other words, support surface 24 is fixed by the cured polyurethane. The person 15' shown in FIG. 8b has a spinal column 17' with a kyphosis in the thoracic area, a scoliosis in the lumbar part and pelvis 16' with a rearward tilted position. The individual orthopaedic back support according to the invention here once again corrects the lumbar-thoracic part and here also follows the rest of the individual contour in an anatomically correct manner, although the person differs in shape relative to person 15. Clearly shown is the greater distance between carrier shell 18' and soft foam part 20' above thoracic Th9 and below lumbar L3 (see FIG. 13d) compared to the person 15 in FIG. 8a.

Figure 9A:
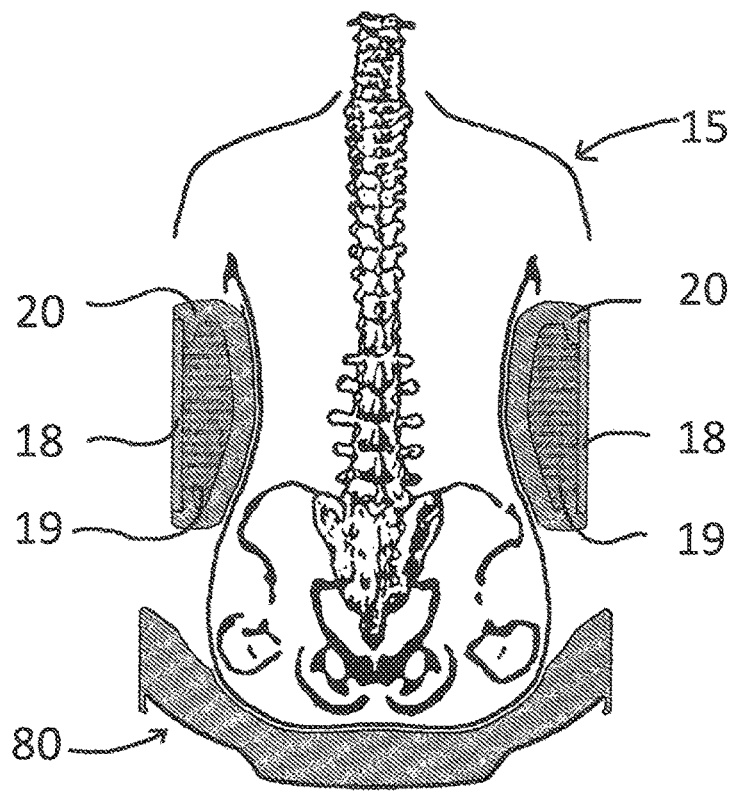

FIG. 9a shows a frontal section in rear view of the seated person 15 of FIG. 8a. It is apparent that side supports 9,10 on the left and right-hand side of backrest 2 are shaped to the contour of person 15. Carrier shell 18 here also provides the basis for soft foam part 20, the carrier shell 18 and soft foam part 20 together enclosing the space 19. FIG. 9a also shows a seat part 80 comprising a hard shell with a pressure distributing medium thereon. Seat part 80 supports the person in vertical direction.

Figure 9B:
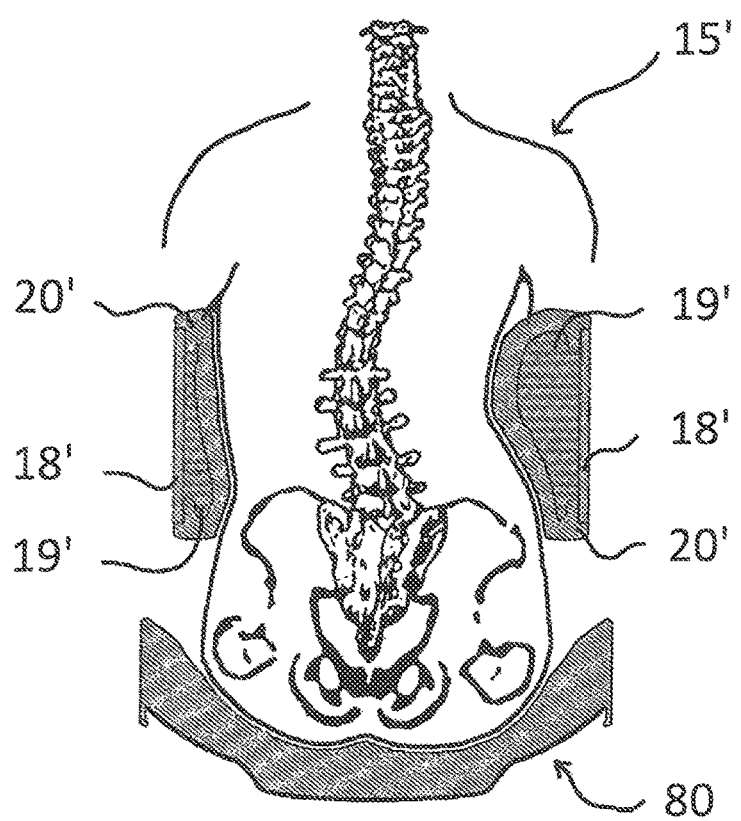

FIG. 9b shows the same as FIG. 9a but for the person 15' of FIG. 8b. In this frontal section it can clearly be seen that spinal column 17' does not follow a straight line but has acquired several curvatures due to scoliosis. Side supports 9',10', which impart lateral support to person 15', are shaped to the contour of person 15' in that the volume 19' filled with polyurethane exerts pressure on person 15'. FIG. 9b shows that the distance between carrier shell 18' and soft foam part 20' is greater for side support 9' than for side support 10', whereby the volume 19' on the right-hand side (of side support 10') is also greater than the volume 19' on the left-hand side (of side support 9').

Figure 10A:
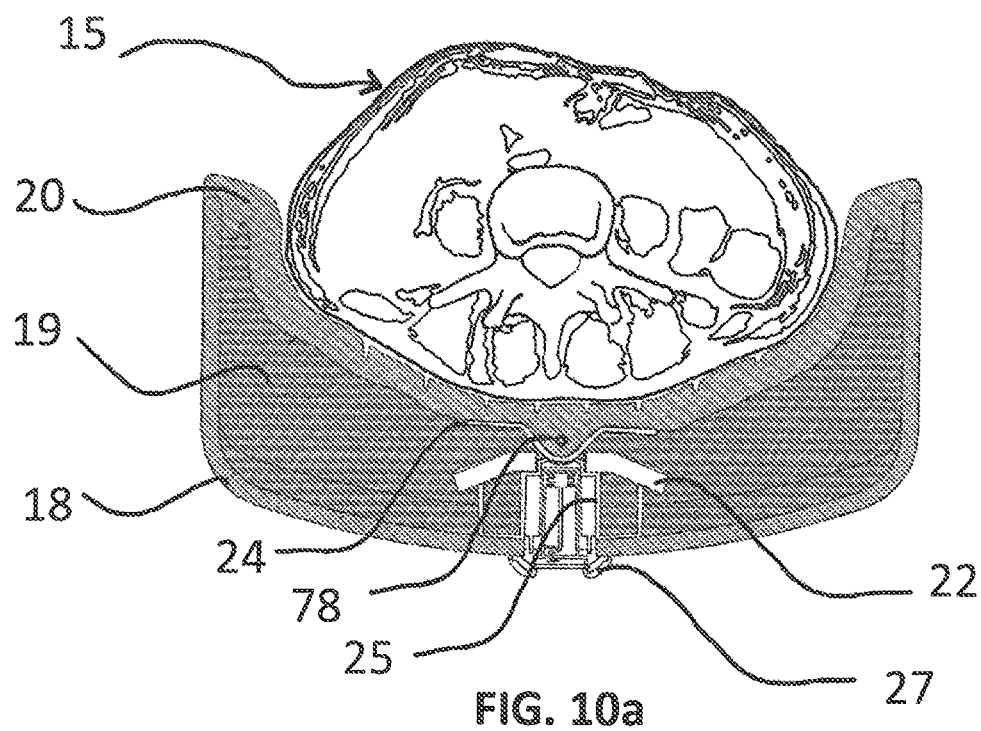

FIG. 10a shows a cross-section at the position of lumbar 4 of the same seated person 15' of FIGS. 8a and 9a, wherein the fit of backrest 2 according to the invention is adjusted in three steps. In FIG. 10a the soft foam part 20 and the polyurethane foam in volume 19 have already shaped themselves to the individual shape of person 15. The cross-section of FIG. 10a shows the eight grooves 93 in soft foam part 20 through which the forced airflow flows along the back of seated person 15, as elucidated above with reference to FIG. 4. In volume 19 the foamed polyurethane is present between carrier shell 18 and the pressure distributing medium, i.e. the soft foam part 20. In the second step this polyurethane, which is liquid at least in the second step, exerts a pressure on soft foam part 20 and person 15, and in the third step will be fixed by curing. As shown in FIG. 10a, the support imparted to the back of the seated person by the polyurethane is interrupted as seen in transverse direction by a support surface 24 comprising the first back part 5 and optionally the third back parts 11, 12, 13 and 14, which back parts are further elucidated with reference to FIG. 3. As described above, the first back part 5 has a stiffness such that during use the part of the back substantially shapes itself to first back part 5, while the back of the seated person also determines the position of first back part 5 to some extent by the limited possible rotation of back part 5 about rotation axis 78. The back is hereby corrected by the first back part 5, while some freedom is also allowed for the possible asymmetry of the person concerned. Support surface 24 is supported by housing 25, using which the support surface 24 is placed at an angle relative to the main plane of carrier shell 18. Further shown in this cross-section is a seal 22 which ensures that an airtight and liquid-tight channel is formed for air throughflow from housing 25 to the free-rotating support surface 24.

Figure 10B:
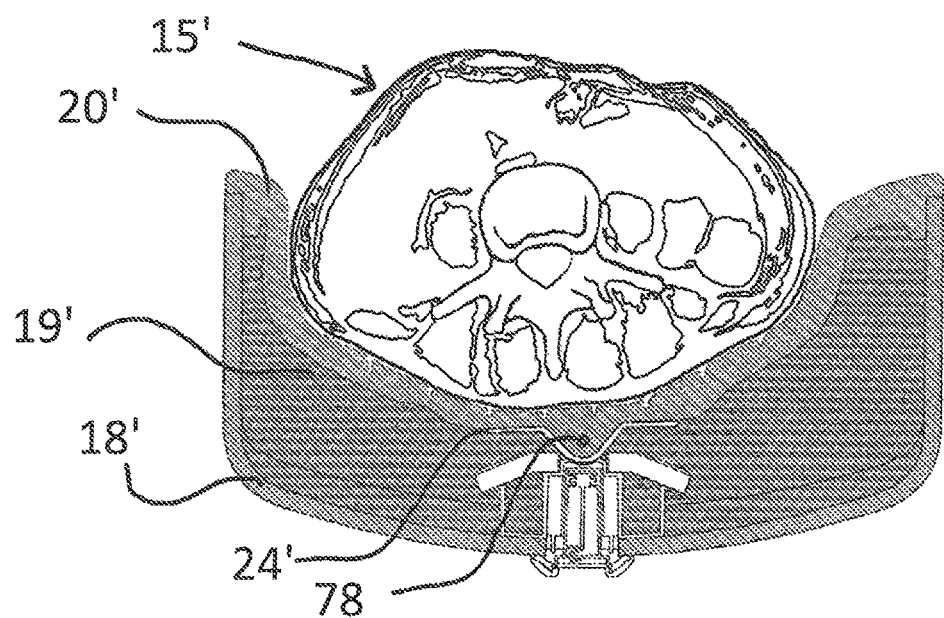
FIG. 10b shows a transverse cross-section at the position of the lumbar part of the second seated person of FIGS. 8a and 9b.

FIG. 10*b* shows a transverse cross-section at the position of lumbar L4 (see FIG. 13*d*) of seated person 15' of FIG. 8*b*. In this FIG. 10*b* the fit of backrest 2 according to the invention is adjusted for a spinal column with scoliosis. Shown is that support surface 24' yields to some extent to the asymmetry of the person by pivoting to a certain extent round axis 78. FIG. 10*b* shows that in the right-hand side support 10' the distance between the pressure distributing element 20' and carrier shell 18' is greater than this distance in the case of person 15 in FIG. 10*a*. In the left-hand side support 9' the distance between pressure distributing element 20' and carrier shell 18 is on the other hand smaller than in FIG. 10*a* because at this height the scoliosis has displaced the centre of the spinal column to the left relative to the target median plane.

Figure 11:
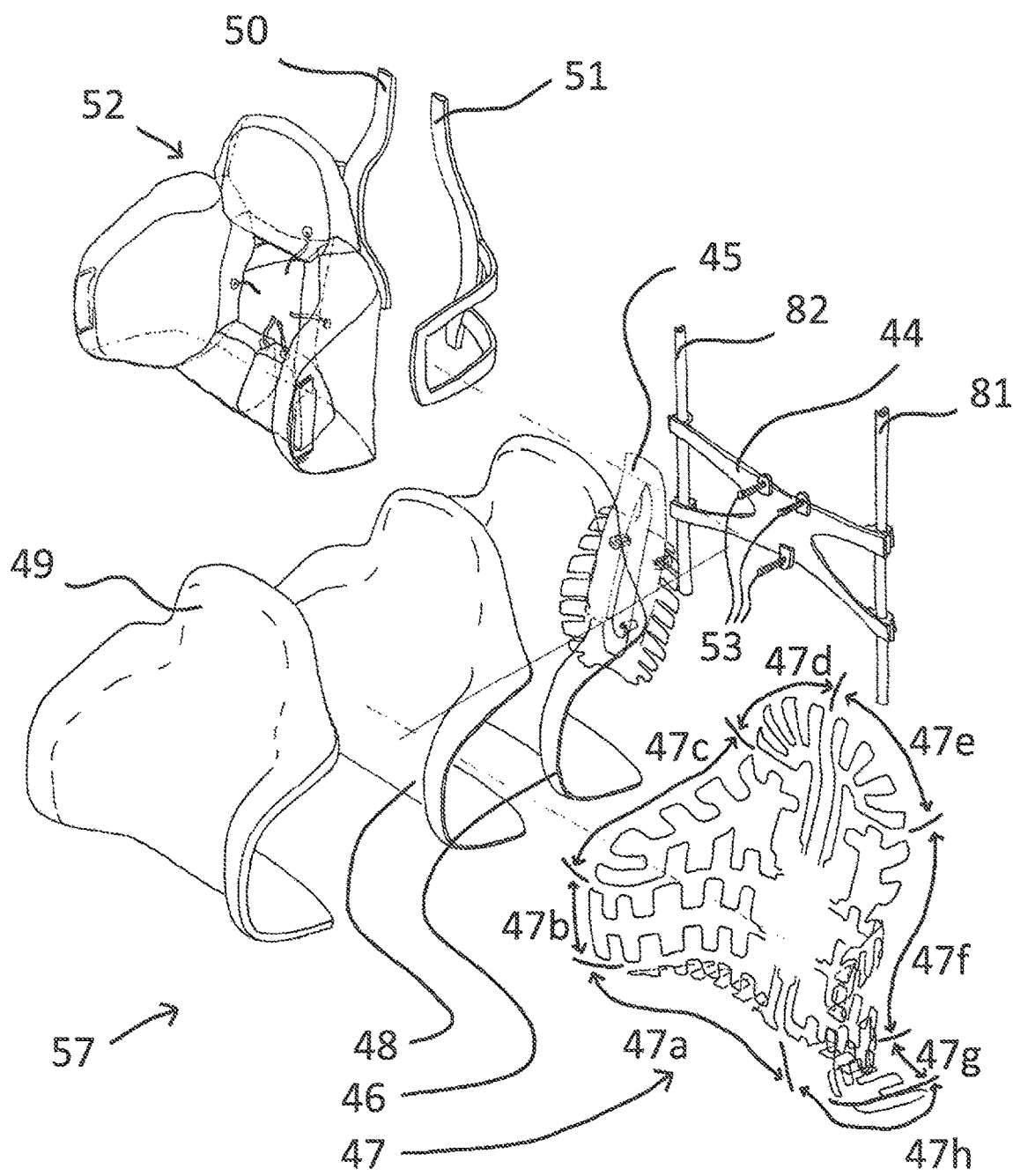
FIG. 11 shows an exploded view of a backrest according to another embodiment of the invention.

FIG. 11 shows an exploded view of a backrest 57 according to another embodiment of the invention. Backrest 57 comprises a second back part which can be shaped and fixed in thermoplastic manner. In the embodiment of FIG. 11 the second back part comprises a sandwich consisting of layer 46, layer 47 and layer 48. Layers 46, 48 consist of a thermoplastic material, such as for instance Ethylene Vinyl Acetate. This material becomes soft above a desired temperature, which for this application lies around 50° C. Below this temperature the material is stiff. Extending between layers 46, 48 is a layer 47 which comprises different heating elements 47*a*-47*h*. Heating elements 47*a*-47*h* can be controlled such that they optionally generate heat to layers 46,48. Layers 46,48 will be heated in the area of the heat-emitting heating elements 47*a*-47*h* to above the softening temperature of the thermoplastic material, whereby the thermoplastic material will become soft and can therefore be shaped in these areas. When layers 46,48 are in their deformable state, i.e. in the first stage, layers 46,48 can be shaped to the other part of the back of the person, so that during use layers 46,48 shape themselves practically continuously to the back of a seated person by a pressure being exerted on layers 46,48 by the back. After shaping the heating elements 47*a*-47*h* can be controlled so as to no longer generate heat, so that the temperature of layers 46,48 will decrease to below the softening temperature, whereby layers 46,48 are fixed in their setting shaped to the other part of the back.

FIG. 11 shows that a pressure distributing element 49 with a cover is mounted on layer 48. Layer 46 is mounted on support surface 45, comprising a first back part, which supports the lumbar-thoracic part of the back of the seated person. Support surface 45 is carried by a carrier 44 fixed to frame tubes 81 and 82 of wheelchair 1. Pressure cells 52 and support brackets 50 and 51 can be at least temporarily arranged to support the layer 46 in the first step. These pressure cells 52 and support brackets 50 and 51 are placed on the front side of carrier 44 so that a controlled pressure is exerted on layer 46, this pressure being transmitted to layers 47, 48 and the pressure distributing medium 49. As soon as the sandwich is heated it can be shaped and is deformed by means of the pressure from the pressure cells so that it takes on the contour of the person. Once cooled, the back support retains its shape and pressure cells 52 and temporary support brackets 50 and 51 are once again removed. Pressure cells 52 and support brackets 50 and 51 can optionally support the layer 46 permanently.

Adjustment of backrest 57 according to the embodiment of FIG. 11 therefore takes place according to the above described three steps, i.e. first adjusting the support surface 45 comprising the first back part relative to frame 80,81 of wheelchair 1, then shaping the second back part to the back of the seated person by at least locally heating the thermoplastic layers 46,48, and in the third step fixing the second back part in its shaped position by allowing or forcing cooling of thermoplastic layers 46,48.

FIG. 12*a* is a rear view of the adjustable pressure cells 52 of FIG. 11, showing that backrest 57 has five pressure cells 52*a*-52*e* which are each adjustable separately of the other pressure cells 52*a*-52*e*. Adjustment of pressure cells 52*a*-52*e* takes place by filling pressure cells 52 with air using filling hoses, which are each connected on one side for medium throughflow to a respective pressure cell 52*a*-52*e* and connected on the other for medium throughflow to a shared valve and pump.

FIG. 12*b* is a transverse cross-section of backrest 57 of FIG. 11 showing three filled pressure cells 52*a*, 52*b* and 52*c*. It is noted that FIG. 12*b* shows backrest 57 without a person supporting against it. The thermoplastically deformable sandwich layer 83 consists of layer 46, layer 47 and layer 48, which have been further described with reference to FIG. 11. FIG. 12*b* shows the function of the temporarily arranged brackets 50 and 51, i.e. to provide temporary support for positioning of pressure cells 52*a*-52*e* and to transmit the generated pressure force. Pressure distributing layer 49 is flexible and provided with a cover.

FIG. 12*c* shows a rear view of backrest 57 of FIG. 11, now however without pressure cells 52*a*-52*e* and brackets 50 and 51, as backrest 57 is used after it has been shaped to the individual contour of a person.

FIG. 12*d* shows a transverse cross-section of the backrest of FIG. 11 without pressure cells and seated person. FIG. 12*d* shows how the layers are connected and supported from frame tubes 80 and 81 of the seating device, i.e. by means of screws 44, which are connected to support surface 45.

An advantage of a second back part comprising thermoplastic material is that the second back part can optionally be reheated after a prior fixation so that the back part becomes soft and can be shaped once again, for instance to the back of a different person.

A brief explanation will now be given with reference to FIGS. 13*a*, 13*b*, 13*c* and 13*d* as to why a backrest which is segmented and without pivot axis is necessary.

Figures 13A, 13B:
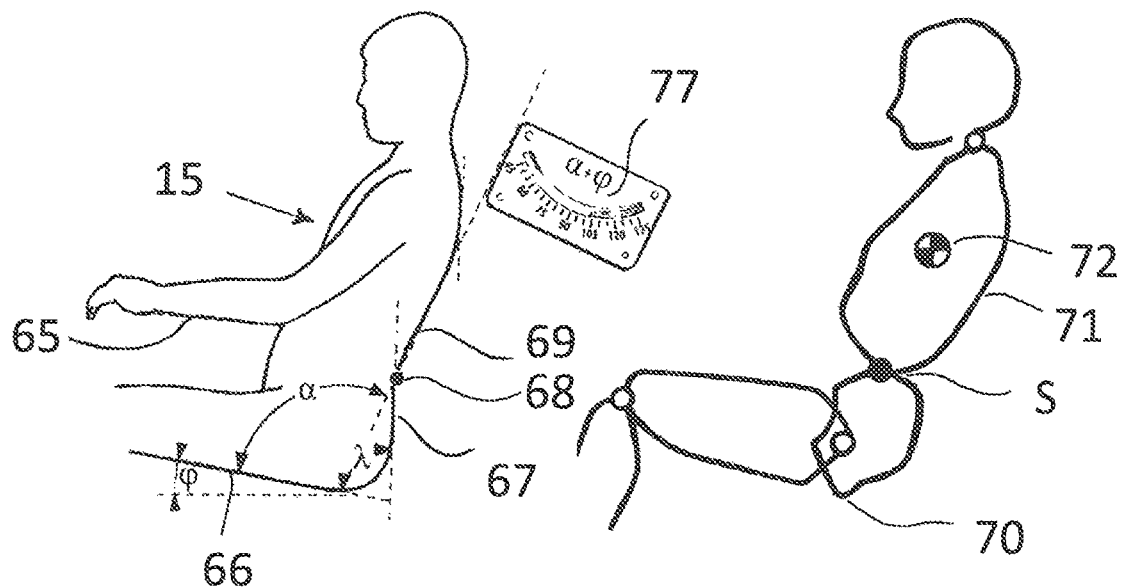
FIG. 13a shows a schematic side view of a seat part in combination with a backrest according to the invention and a seated person.
FIG. 13b shows a schematic cross-section of a seated person.

FIG. 13*a* defines in side view the position angles α and φ of person 15. The angle (α+φ) is important for the present invention. It can be seen that this angle must be measured from the deepest point of the lumbar, point 68. The functional back support angle (α+φ) of the person along support surface 69 is measured in this case by spirit level 77, which indicates 120°. The functional seating angle (α+φ) of a person preferably lies between about 115° and 123°.

FIG. 13*b* shows a model which gives an approximation of the biomechanical properties of the human body. The difference between the model and the actual human body is caused by pivot point S and the actual pivoting action of the spinal column. S is in reality therefore not a pivot point, but L1-L5 together form the pivoting movement between the lower back and upper back.

Figures 13C, 13D, 13E:
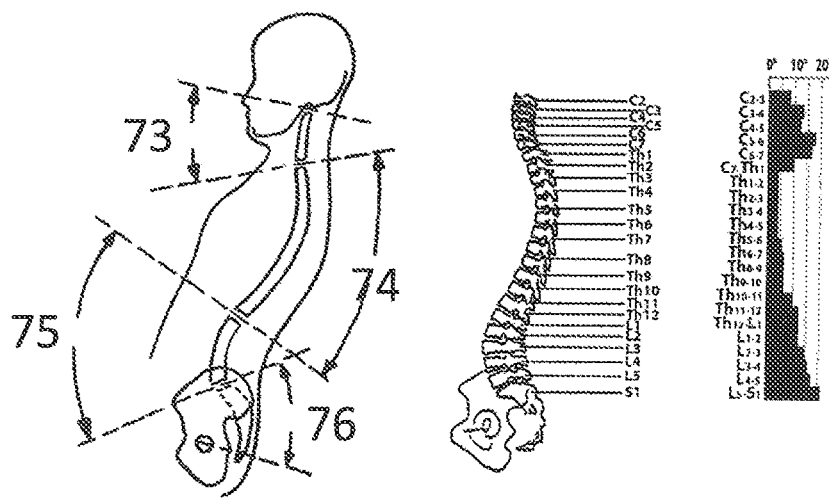
FIG. 13c is a schematic representation of a seated person showing the spinal column divided into four segments.
FIG. 13d is a schematic representation of a spinal column.
FIG. 13e is a graphic representation of the relative freedom of the angle of flexure of all vertebrae of the spinal column.

FIG. 13*c* defines the four vertebral segments refereed to as cervical 73, thoracic 74, lumbar 75 and sacral 76.

As already stated, FIG. 13*d* shows an overview of the spinal column with the individual vertebrae and their scientific designation.

FIG. 13*e* indicates the maximum angle of rotation in the lateral plane (flexion/extension) the spinal column allows between adjoining vertebral discs.

Figure 14A:
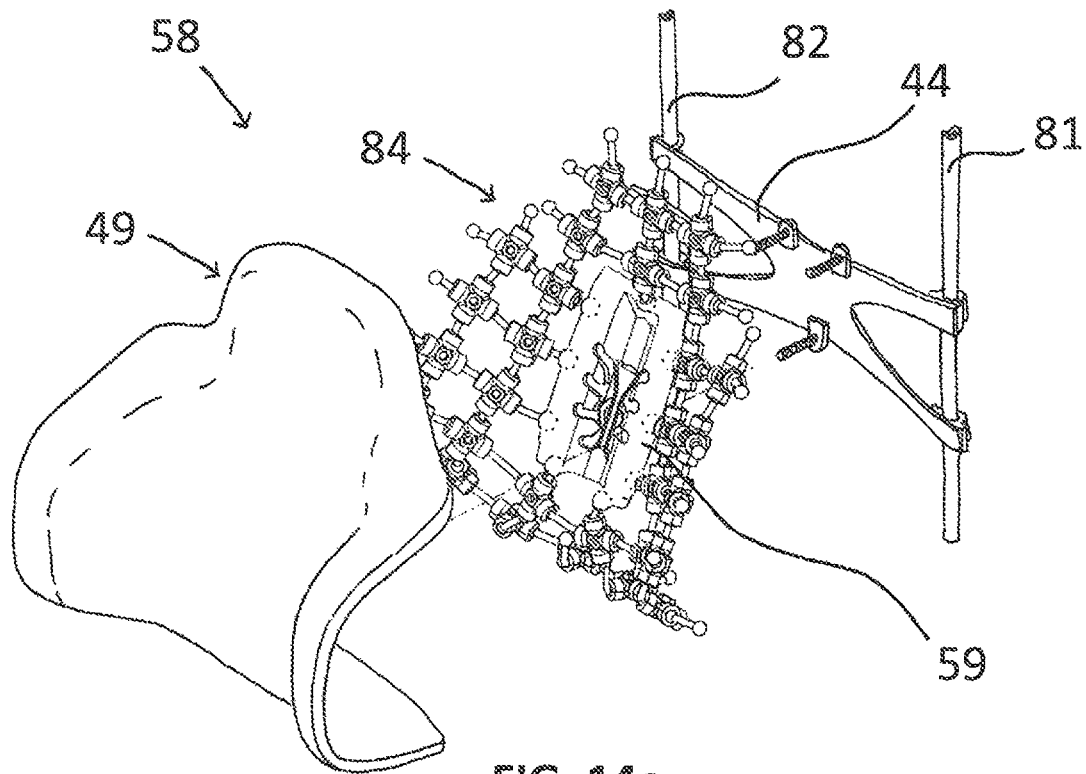
FIGS. 14a, 14b, 14c and 14d show another embodiment of the backrest according to the invention with a mechanical clamp construction.
Figures 14B, 14C:
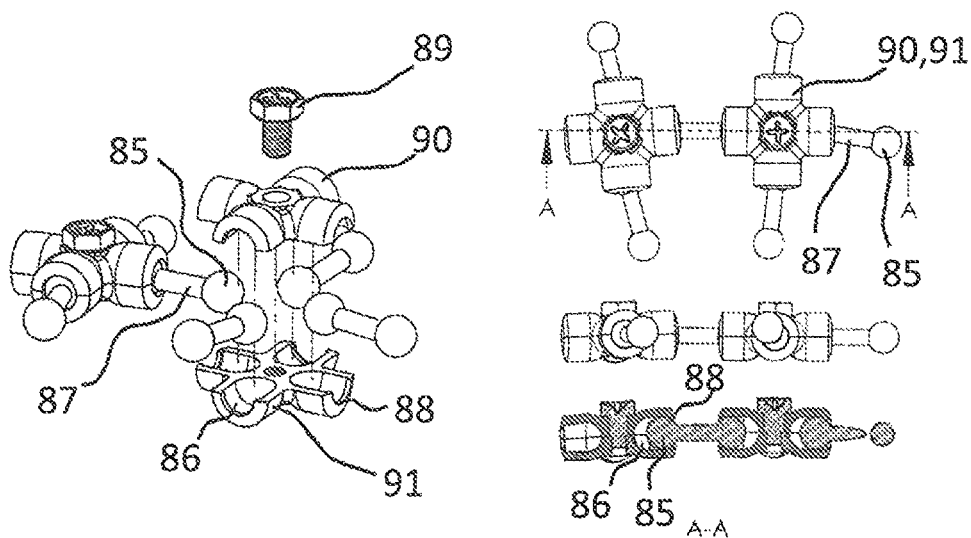

FIG. 14*a* shows an exploded view of a backrest 58 according to a subsequent embodiment of the invention. The second back part 84 of backrest 58 can be mechanically shaped and fixed. The first back part 59 has a stiffness such that during use the part of the back of a person shapes itself to first back part 59. First back part 59 can optionally be rotatable to some extent in order to yield to possible asymmetry of a person. Second back part 84 comprises a number of coupling elements 90,91, each comprising four cylindrical cavities 86 adapted to receive spherical outer ends 85 of coupling rods 87. As shown in FIG. 14*c*, cylindrical cavities 86 have close to their open end zones a flange 88 extending radially inward, wherein a distance between two opposite end zones of flange 88 is smaller than the diameter of a spherical outer end 85, such that the spherical outer ends 85 cannot be removed from cylindrical cavities 86. As shown in FIG. 14*b*, coupling elements 90,91 comprise two halves 90,91 which can be mutually connected by means of a bolt 89. In unconnected position the coupling rods can be arranged with their spherical outer ends 85 in cylindrical cavities 86, or conversely removed. The spherical outer ends 85 are in this way arranged displaceably in cylindrical cavities 86 as a kind of ball joint. The coupling elements 90,91 mutually coupled by coupling rods 87 form the second back part 84, which is in this way flexible such that the second back part is can be shaped to the other part of the back of the person. By firmly tightening bolt 89 the peripheral walls of cylindrical cavities 86 are brought into engagement on the spherical outer ends 85, whereby spherical outer ends 85 are fixed in cylindrical cavities 86 in a determined position such that second back part 84 is fixed in its setting shaped to the other part of the back. Second back part 84 and first back part 59 are mutually connected by means of similar or identical coupling rods 87, which are rigidly connected with their ball-shaped outer ends 85 to the peripheral edge zone of first back part 59.

FIG. 14*c* shows a front and top view of two coupling elements 90,91 which are mutually coupled by coupling rods 87, as well as a cross-section A-A in which the connection of the parts is shown.

Figure 14D:
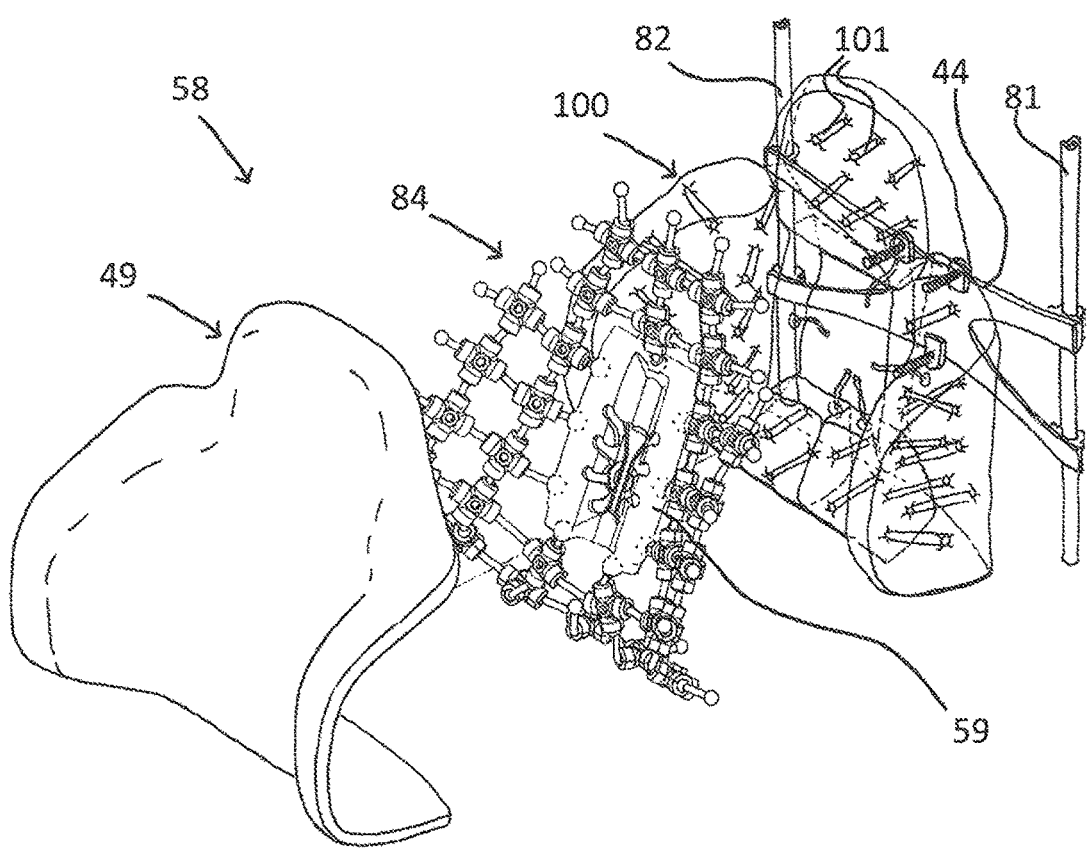

FIG. 14*d* shows the exploded view of backrest 58 according to FIG. 14*a*, wherein an (air) bellows 100 is also shown. The (air) bellows 100 can be disposed, optionally temporarily, on a side of second back part 84 remote from the pressure distributing layer 49 and on the front side of carrier 44 for the purpose of adjusting second back part 84. When the back of a seated person exerts pressure on second back part 84, the (air) bellows 100 provides a counterpressure so that second back part 84 shapes itself to the back of the seated person. The (air) bellows 100 has the same function here as the above described pressure cells 52(*a-e*). Bellows 100 can be filled with another medium such as water instead of air.

As further shown in FIG. 14*d*, bellows 100 has a number of through-openings 101, the positions of which correspond to the positions of bolts 89 of coupling elements 90,91. Bolts 89 can be tightened via openings 101 in order to fix second back part 84 in its position shaped to the back of the person, for instance using a screwdriver (not shown).

As shown in FIGS. 14*a* and 14*d*, a large number of coupling elements 90,91 are provided so that shaping the second back part to the back of a person can take place substantially continuously. Substantially continuously is here understood to mean that a minimum of three shaping zones are provided per 10 cm$^2$. Four shaping zones are for instance provided per 10 cm$^2$. The shaping zones are preferably distributed uniformly over the surface of second back part 84.

FIG. 15*a* is a perspective front view of a second embodiment of the carrier shell 18 shown in FIGS. 4, 5, 9*a*, 9*b*, 10*a* and 10*b*. Carrier shell 18 according to FIG. 15*a* comprises on either side thereof a receiving device 102 with two pressure relief valves 103. Pressure relief valves 103 open automatically when too much polyurethane foam is added to cavity 19 of the second back part, so that the polyurethane foam leaves cavity 19 via pressure relief valves 103 and is received in a receiving cavity 104 of receiving device 102 (see FIGS. 15*b* and 15*c*). The resistance of pressure relief valves 103 is determined by a spring 105 and can therefore be set by choosing a spring 105 with a determined tension. As described above, air present in cavity 19 leaves cavity 19 through foam part 20 so that polyurethane foam is then discharged to receiving device 102 only when the volume of foam in cavity 19 is too great, and not due to a buildup of air pressure. Receiving devices 102 are arranged such that they cannot be discerned visually and cannot be felt by a seated person. Nor is the sitting posture of the seated person influenced by the presence of receiving devices 102. The receiving devices can remain permanently present in the backrest, wherein they are optionally at least partially filled with polyurethane foam. It is also possible for receiving devices 102 to be arranged such that they are removed after fixation of the second back part.

As described above, receiving device 102 has two pressure relief valves 103. Two pressure relief valves 103 provide the advantage that, if one of the two fails, the other can still function. Instead of two, any number of pressure relief valves can therefore be provided, such as one when a reserve pressure relief valve is not necessary, or conversely three or four, when more reliability is required. Any number of receiving devices 102 can be provided instead of two receiving devices 102.

As will be apparent from the diverse embodiments of the backrest according to the invention, the first back part and the second back part can be disposed and/or connected in different ways relative to each other. It is thus possible for the first back part to be disposed in a hollow space forming at least a part of the second back part or, conversely, to enclose a part of the hollow space, particularly a rear side of the hollow space. It is also possible for the second back part to be mounted on or indirectly connected to the first back part. The first back part extends here for instance on a side remote from the back of the seated person, or the first back part forms a central part, wherein the second back part forms a peripheral edge of the central first back part. Diverse setups are possible, wherein it is important that the first back part supports at least a part of the back, in particular the lumbar-thoracic part of the back, at a correct angle relative to the frame of the seating device and the second back part supports another part of the back by shaping itself to this other part of the back.

It is noted that the invention is not limited to the above discussed exemplary embodiments, but also extends to other variants within the scope of the appended claims.

It is thus possible for the second back part to comprise for instance a hollow space filled with memory foam, an air bellows or an elastic net, so that the second back part remains permanently in its first stage. Such a second back part cannot therefore be fixed in its position shaped to the back of a person. Such a permanent flexible second back part can for instance be advantageously applied in seating devices which are used by different people each time, such as for instance in aircraft, train or cinema seats, or in wheelchairs which are the property of a hospital and are temporarily made available to a patient.

The invention claimed is:

1. Backrest for supporting the back of a seated person, the backrest comprising mounting means for mounting the backrest on a frame of a seating device;
   wherein the backrest comprises:
   a first back part for supporting at least a part of the back of the person at a determined angle, which first back part comprises a first stiffness such that during use the part of the back shapes itself substantially to the first back part, and wherein the first back part is adjustably supported relative to the frame for adjusting the angle of the first back part relative to the frame;
   a second back part comprising a second stiffness which is less than the first stiffness, the second back part configured to form a continuous three-dimensional shape surrounding the first back part and corresponding to a second part of the back of the person; and
   a third back comprising a resilient leaf spring having one end fixed to a peripheral edge of the first back part and another free end overlapping and supported on a portion of the second back part to form a gradual transition of shape and pressure between the first back part and the second back part.

2. Backrest as claimed in claim 1, wherein the second back part is configured to be adjustable from a first stage, in which the second back part has the second stiffness configured to form the continuous three-dimensional shape corresponding to the second part of the back of the person, to a second stage in which the second back part is configured to be fixed in the formed continuous three-dimensional shape corresponding to the second part of the back of the person.

3. Backrest as claimed in claim 2, wherein the second back part is configured to be fixed in a mechanical, chemical, thermoplastic or thermosetting manner.

4. Backrest as claimed in claim 3, wherein the second back part comprises a cavity with a filling opening configured to supply to the cavity a filler which can be fixed in a chemical, thermoplastic or thermosetting manner.

5. Backrest as claimed in claim 4, wherein the cavity comprises a pressure relief valve for discharging excess filler from the cavity.

6. Backrest as claimed in claim 2, wherein the second back part is adjustable from the second stage to the first stage.

7. Backrest as claimed in claim 1, comprising suction means for drawing in ambient air, which suction means are connected on one side of the backrest for medium throughflow from a surrounding area and are connected on another side of the backrest for medium throughflow to openings in a side of the backrest facing toward the back of the seated person.

8. Backrest as claimed in claim 1, comprising heating means for heating at least the second back part to above a softening temperature in order to soften at least the second back part.

9. Backrest as claimed in claim 1, comprising an angle measuring device connected to the first back part, which angle measuring device is adapted to measure and display the angle of the first back part relative to the frame.

10. Backrest as claimed in claim 1, wherein the first back part is provided on its side facing toward the seated person with a pressure distributing medium.

11. Backrest as claimed in claim 1, wherein the mounting means are adapted to mount the backrest at a determined location and/or at a determined angle relative to the frame.

12. Backrest as claimed in claim 1, comprising an optionally releasable counterpressure element for providing a counterpressure on the second back part for the purpose of shaping the second back part to the second part of the back of the person.

13. Method for adjusting a backrest, comprising the steps, to be performed in suitable sequence, of:
   a) providing a backrest as claimed in claim 1, which backrest is intended to support the back of a seated person, which backrest comprises:
      mounting means for mounting the backrest and at least two back parts on a frame of a seating device;
   b) mounting the backrest at a determined location and/or at a determined angle on the frame of the seating device;
   c) adjusting the angle and/or the position of the first back part relative to the frame; and
   d) the second back part forming a continuous three-dimensional shape corresponding to the second part of the back of the person.

14. Method as claimed in claim 13, wherein step c) is performed by performing step b).

15. Method as claimed in claim 13, comprising the step of:
   e) fixing the second back part in its setting shaped to the other part of the back.

16. Method as claimed in claim 15, wherein step e) comprises of fixing the second back part in chemical, thermoplastic or thermosetting manner in its setting shaped to the other part of the back.

17. Method as claimed in claim 16, comprising the step, to be performed during or prior to step d), of:
   f) feeding a filler, which can be fixed in chemical, thermoplastic or thermosetting manner, via a filling opening into a cavity of the second back part.

18. A (Wheel)chair, comprising a backrest for supporting the back of a seated person as claimed in claim 1, which backrest is mounted on a frame of the (wheel)chair.

* * * * *